United States Patent
Luo et al.

(10) Patent No.: US 11,683,792 B2
(45) Date of Patent: Jun. 20, 2023

(54) RESOURCE RESELECTION TRIGGER WITH BEAMFORMING

(71) Applicant: QUALCOMM Incorporated, San Diego, CA (US)

(72) Inventors: Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/228,120

(22) Filed: Apr. 12, 2021

(65) Prior Publication Data

US 2021/0329613 A1 Oct. 21, 2021

Related U.S. Application Data

(60) Provisional application No. 63/011,805, filed on Apr. 17, 2020.

(51) Int. Cl.
*H04W 72/08* (2009.01)
*H04W 72/044* (2023.01)
*H04W 72/54* (2023.01)

(52) U.S. Cl.
CPC ......... *H04W 72/046* (2013.01); *H04W 72/54* (2023.01)

(58) Field of Classification Search
CPC ..... H04B 7/088; H04B 7/0695; H04W 76/14; H04W 72/08; H04W 72/046; H04W 72/54
See application file for complete search history.

(56) References Cited

U.S. PATENT DOCUMENTS

| 2019/0045569 | A1 | 2/2019 | Abedini et al. | |
| 2021/0050953 | A1 | 2/2021 | Park | |
| 2021/0168740 | A1 | 6/2021 | Park et al. | |
| 2021/0344460 | A1 | 11/2021 | Park | |
| 2022/0039082 | A1* | 2/2022 | Belleschi | H04W 76/36 |
| 2022/0167180 | A1* | 5/2022 | Choi | H04L 1/0026 |
| 2022/0263628 | A1* | 8/2022 | Liu | H04L 5/0053 |
| 2022/0330318 | A1* | 10/2022 | Shrivastava | H04W 36/03 |

FOREIGN PATENT DOCUMENTS

WO   WO-2019199858 A1   10/2019

OTHER PUBLICATIONS

International Search Report and Written Opinion—PCT/US2021/027014—ISA/EPO—dated Aug. 9, 2021.

\* cited by examiner

*Primary Examiner* — Anez C Ebrahim
(74) *Attorney, Agent, or Firm* — Holland & Hart LLP

(57) ABSTRACT

Methods, systems, and devices for wireless communications are described. A transmitting device (such as a user equipment (UE)) may receive an indication of an allocation of resources for sidelink communication on a set of directional beams. The transmitting device may transmit, to a receiving device (e.g., base station), a capability of the transmitting device to support a beam change. In some examples, the transmitting device may identify a beam change condition for the set of directional beams based on a beam change condition configuration. In some cases, the beam change condition configuration may be based on the capability of the transmitting device. In some cases, the transmitting device may perform a resource reselection procedure for updating the allocation of resources for sidelink communication based on the beam change condition and the beam change condition configuration.

27 Claims, 15 Drawing Sheets

RESOURCE RESELECTION TRIGGER WITH BEAMFORMING

CROSS REFERENCE

The present application for patent claims the benefit of U.S. Provisional Patent application No. 63/011,805 by LUO et al., entitled "RESOURCE RESELECTION TRIGGER WITH BEAMFORMING," filed Apr. 17, 2020, assigned to the assignee hereof, and expressly incorporated by reference herein.

FIELD OF TECHNOLOGY

The following relates generally to wireless communications and more specifically to resource reselection trigger with beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support sidelink communications. Sidelink communications may support communications within a group of UEs. For example, sidelink communications may include communications between a UE and other UEs within a coverage area including the group of UEs. Sidelink communications may be improved, so that UEs may communicate with high reliability.

SUMMARY

The described techniques relate to improved methods, systems, devices, and apparatuses that support resource reselection trigger with beamforming. Generally, the described techniques provide for efficient latency reduction techniques and reliable communications. The described techniques may enable a communication device, which may be a user equipment (UE) in a wireless communications system (e.g., a vehicle-to-everything (V2X) system, a vehicle-to-vehicle (V2V) network, a cellular V2X (C-V2X) network, a device-to-device (D2D) system, and the like) to identify triggering conditions for resource reselection when a transmit beam changes in sidelink communications. According to one or more aspects, a UE may receive an indication of an allocation of resources for sidelink communication on a set of directional beams. In some examples, the UE may utilize at least one transmit beam to perform sidelink communications. The UE may then identify a beam change condition for the set of directional beams based on a beam change condition configuration. In some examples, the beam change condition configuration may be based on a capability of the UE to support a beam change. According to some examples, the UE may update the allocation of resources upon determining a change in the transmit beam. For example, the UE may perform a resource reselection procedure for updating the allocation of resources for sidelink communication based on the beam change condition and the beam change condition configuration.

A method for wireless communications at a UE is described. The method may include receiving an indication of an allocation of resources for sidelink communication on a set of directional beams, identifying a beam change condition for the set of directional beams based on a beam change condition configuration, and performing a resource reselection procedure for updating the allocation of resources for sidelink communication based on the beam change condition and the beam change condition configuration.

An apparatus for wireless communications at a UE is described. The apparatus may include a processor, memory coupled with the processor, and instructions stored in the memory. The instructions may be executable by the processor to cause the apparatus to receive an indication of an allocation of resources for sidelink communication on a set of directional beams, identify a beam change condition for the set of directional beams based on a beam change condition configuration, and perform a resource reselection procedure for updating the allocation of resources for sidelink communication based on the beam change condition and the beam change condition configuration.

Another apparatus for wireless communications at a UE is described. The apparatus may include means for receiving an indication of an allocation of resources for sidelink communication on a set of directional beams, means for identifying a beam change condition for the set of directional beams based on a beam change condition configuration, and means for performing a resource reselection procedure for updating the allocation of resources for sidelink communication based on the beam change condition and the beam change condition configuration.

A non-transitory computer-readable medium storing code for wireless communications at a UE is described. The code may include instructions executable by a processor to receive an indication of an allocation of resources for sidelink communication on a set of directional beams, identify a beam change condition for the set of directional beams based on a beam change condition configuration, and perform a resource reselection procedure for updating the allocation of resources for sidelink communication based on the beam change condition and the beam change condition configuration.

Some examples of the method, apparatuses, and non-transitory computer-readable medium described herein may further include operations, features, means, or instructions for identifying a resource reselection procedure trigger that indicates the beam change condition as a trigger for performing the resource reselection procedure.

Some examples of the method, apparatuses, and non-transitory computer-readable medium described herein may further include operations, features, means, or instructions for identifying a time window associated with the allocation of resources for sidelink communication and performing the resource reselection procedure upon expiration of the time window.

Some examples of the method, apparatuses, and non-transitory computer-readable medium described herein may further include operations, features, means, or instructions for receiving signaling indicating a time window configuration associated with the time window.

Some examples of the method, apparatuses, and non-transitory computer-readable medium described herein may further include operations, features, means, or instructions for identifying a metric associated with the beam change condition configuration.

Some examples of the method, apparatuses, and non-transitory computer-readable medium described herein may further include operations, features, means, or instructions for identifying a change in a direction of the set of directional beams, determining whether the change in the direction of the set of directional beams satisfies a threshold based on the metric, and performing the resource reselection procedure upon determining that the change in the direction of the set of directional beams satisfies the threshold.

In some examples of the method, apparatuses, and non-transitory computer-readable medium described herein, the threshold may be configured according to the set of directional beams.

Some examples of the method, apparatuses, and non-transitory computer-readable medium described herein may further include operations, features, means, or instructions for receiving signaling indicating a configuration associated with the metric.

Some examples of the method, apparatuses, and non-transitory computer-readable medium described herein may further include operations, features, means, or instructions for identifying a set of multiple subsets of directional beams based on the metric and performing the resource reselection procedure upon determining a change in a beam of the set of directional beams from a first subset to a second subset of the set of multiple subsets of directional beams.

In some examples of the method, apparatuses, and non-transitory computer-readable medium described herein, the metric quantifies one or more of a directional change with respect to a beam of the set of directional beams, a directional change between a center of a beam of the set of directional beams and a transmission direction, a set of multiple subsets of directional beams, or a combination thereof.

Some examples of the method, apparatuses, and non-transitory computer-readable medium described herein may further include operations, features, means, or instructions for transmitting, to a base station, a capability of the UE to support a beam change, where the beam change condition configuration may be based on the capability of the UE.

In some examples of the method, apparatuses, and non-transitory computer-readable medium described herein, the beam change condition includes one or more of receiving instructions from a base station to change a beam of the set of directional beams, autonomously changing a beam of the set of directional beams, or a combination thereof.

In some examples of the method, apparatuses, and non-transitory computer-readable medium described herein, the sidelink communication may be associated with licensed spectrum or unlicensed spectrum.

In some examples of the method, apparatuses, and non-transitory computer-readable medium described herein, the set of directional beams includes one or more directional beams.

A method for wireless communications at a base station is described. The method may include transmitting an indication of an allocation of resources for sidelink communication on a set of directional beams, receiving, from a UE, a capability of the UE to support a beam change, determining a beam change condition configuration based on the capability of the UE, and configuring the UE to identify a beam change condition for the set of directional beams based on the beam change condition configuration.

An apparatus for wireless communications at a base station is described. The apparatus may include a processor, memory coupled with the processor, and instructions stored in the memory. The instructions may be executable by the processor to cause the apparatus to transmit an indication of an allocation of resources for sidelink communication on a set of directional beams, receive, from a UE, a capability of the UE to support a beam change, determine a beam change condition configuration based on the capability of the UE, and configure the UE to identify a beam change condition for the set of directional beams based on the beam change condition configuration.

Another apparatus for wireless communications at a base station is described. The apparatus may include means for transmitting an indication of an allocation of resources for sidelink communication on a set of directional beams, means for receiving, from a UE, a capability of the UE to support a beam change, means for determining a beam change condition configuration based on the capability of the UE, and means for configuring the UE to identify a beam change condition for the set of directional beams based on the beam change condition configuration.

A non-transitory computer-readable medium storing code for wireless communications at a base station is described. The code may include instructions executable by a processor to transmit an indication of an allocation of resources for sidelink communication on a set of directional beams, receive, from a UE, a capability of the UE to support a beam change, determine a beam change condition configuration based on the capability of the UE, and configure the UE to identify a beam change condition for the set of directional beams based on the beam change condition configuration.

Some examples of the method, apparatuses, and non-transitory computer-readable medium described herein may further include operations, features, means, or instructions for configuring the UE to perform a resource reselection procedure for updating the allocation of resources for sidelink communication based on the beam change condition and the beam change condition configuration.

Some examples of the method, apparatuses, and non-transitory computer-readable medium described herein may further include operations, features, means, or instructions for identifying a resource reselection procedure trigger that indicates the beam change condition as a trigger for performing the resource reselection procedure.

Some examples of the method, apparatuses, and non-transitory computer-readable medium described herein may further include operations, features, means, or instructions for identifying a time window associated with the allocation of resources for sidelink communication and configuring the UE to perform a resource reselection procedure upon expiration of the time window.

Some examples of the method, apparatuses, and non-transitory computer-readable medium described herein may further include operations, features, means, or instructions for determining a time window configuration associated with the time window and transmitting signaling indicating the time window configuration associated with the time window.

Some examples of the method, apparatuses, and non-transitory computer-readable medium described herein may further include operations, features, means, or instructions for identifying a metric associated with the beam change condition configuration.

Some examples of the method, apparatuses, and non-transitory computer-readable medium described herein may further include operations, features, means, or instructions for determining a configuration associated with the metric and transmitting signaling indicating the configuration associated with the metric.

In some examples of the method, apparatuses, and non-transitory computer-readable medium described herein, the metric quantifies one or more of a directional change with respect to a beam of the set of directional beams, a directional change between a center of a beam of the set of directional beams and a transmission direction, a set of multiple subsets of directional beams, a change in power level of a directional beam, or a combination thereof.

In some examples of the method, apparatuses, and non-transitory computer-readable medium described herein, the beam change condition includes transmitting instructions to the UE to change a beam of the set of directional beams.

In some examples of the method, apparatuses, and non-transitory computer-readable medium described herein, the sidelink communication may be associated with licensed spectrum or unlicensed spectrum.

In some examples of the method, apparatuses, and non-transitory computer-readable medium described herein, the set of directional beams includes one or more directional beams.

DETAILED DESCRIPTION

Figure 1:
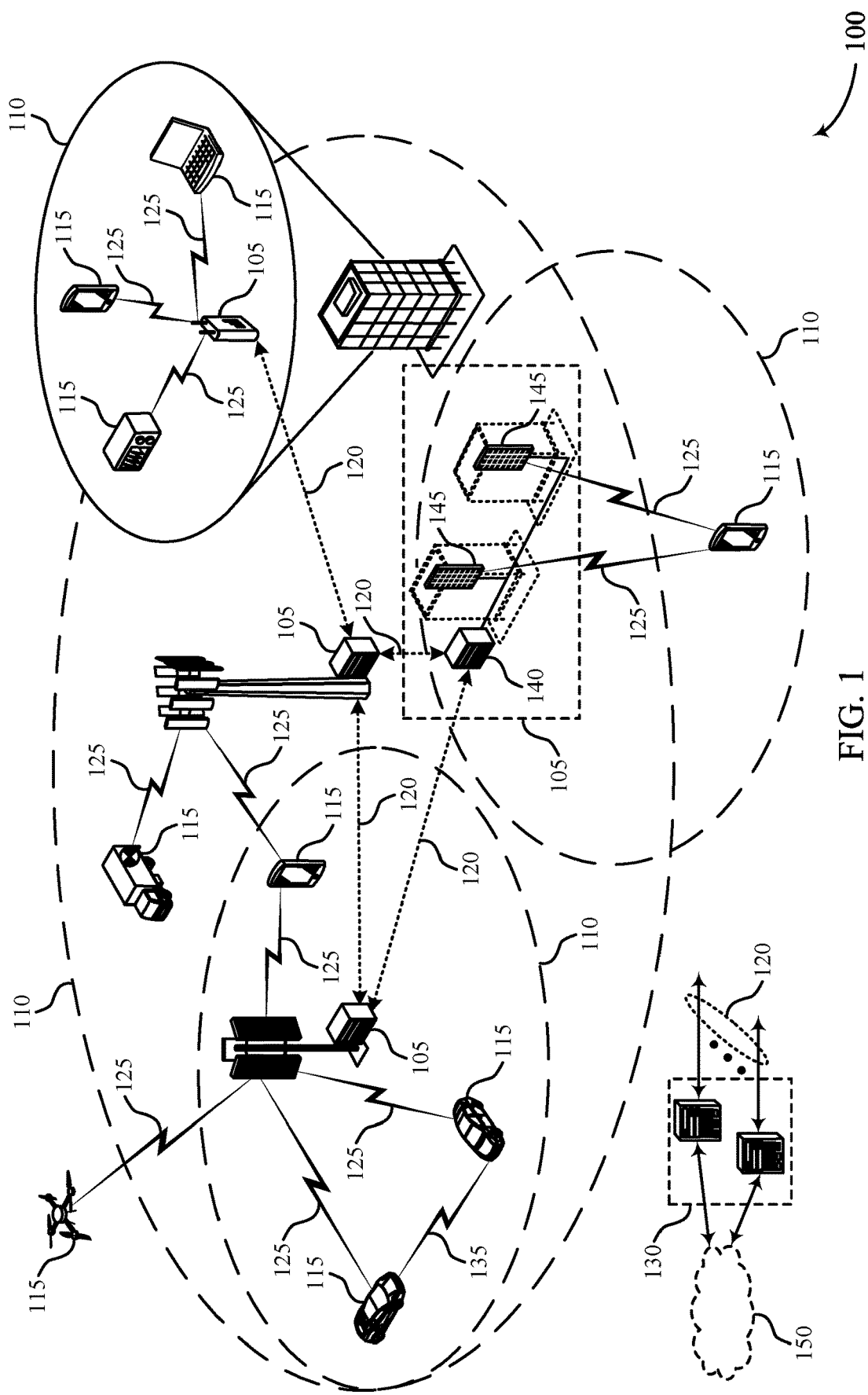
FIG. 1 illustrates an example of a system for wireless communications that supports resource reselection trigger with beamforming in accordance with aspects of the present disclosure.

A wireless communications system may support both access links and sidelinks for communications between one or more communication devices. An access link may refer to a communication link between a user equipment (UE) and a network entity such as a base station. For example, an access link may support uplink signaling, downlink signaling, connection procedures, or a combination thereof. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of a device-to-device (D2D) communications, vehicle-to everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. For example, a UE may have information to transmit to the group of UEs (e.g., a detection of an object or obstacle on a road in a V2X system, scheduling information, among other examples) and the UE may initiate sidelink communications including the information to the other UEs. The other UEs may monitor sidelink resource pools for the sidelink communications. In some examples, base stations may not be involved in sidelink communications because multiple UEs on the sidelink may receive a data transmission from a single UE, or a single UE may receive data transmissions from multiple UEs. In some examples, V2X communication may support two modes of resource allocation. In a first mode (e.g., mode 1), resources may be scheduled by a base station, and in a second mode (e.g., mode 2), a UE may perform autonomous resource selection.

Some wireless communications systems supporting sidelink communications may employ beamforming in order to overcome communication range limitations that result from relatively high path losses associated with frequencies in the system. In some cases, transmitters of sidelink communications may perform a resource reselection procedure. For wireless communications systems operating with transmit beamforming, triggering conditions may be used for resource reselection when a beam changes in a wireless communications system.

One or more aspects of the present disclosure provide for wireless communications systems supporting V2X transmission, where a transmit beam changes due to one or more conditions (such as upon expiration of a time window, in order to increase efficiency, etc.). In some cases, a transmitting device (e.g., a UE) may receive a resource allocation for a sidelink channel. For example, the UE may receive an indication of an allocation of resources for sidelink communication on a set of directional beams. As described herein, the sidelink channel may be associated with an unlicensed spectrum or a licensed spectrum. In some cases, the UE may identify a beam change condition for the set of directional beams based on a beam change condition configuration. For example, the UE may identify a resource reselection procedure trigger that indicates the beam change condition as a trigger for performing the resource reselection procedure. In one example, the UE may identify a time window associated with the allocation of resources for sidelink communication. Additionally or alternatively, the UE may identify a change in a direction of the set of directional beams and may determine whether the change in the direction of the set of directional beams satisfies a threshold based on a metric. Upon identifying the beam change condition and the beam change trigger, the UE may perform a resource reselection procedure for updating the allocation of resources for sidelink communication based on the beam change condition and the beam change condition configuration.

UEs capable of sidelink communications may utilize the techniques described herein to experience power saving, such as reduced power consumption and extended battery life while ensuring reliable and efficient communications in the group of UEs. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of additional wireless communications systems and process flows. Aspects of the disclosure are further illustrated by and described with reference to diagrams and flowcharts that relate to resource reselection trigger with beamforming.

FIG. 1 illustrates an example of a wireless communications system 100 that supports resource reselection trigger with beamforming in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultrareliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications system may support both access links and sidelinks for communications between one or more communication devices. An access link may refer to a communication link between a UE 115 and a base station 105. A sidelink may refer to any communication link between similar wireless devices (e.g., a communication link between UEs 115, or a backhaul communication link between base stations 105). In some examples, certain wireless communications systems may support two modes for resource allocation. In mode 1, a base station 105 may allocate the resources for the UEs 115 participating in sidelink communications. In mode 2, the UEs 115 may perform autonomous resource selection. In some cases, UEs 115 participating in sidelink communications may perform a transmission resource reselection procedure. In wireless communications systems supporting V2X transmission, one or more conditions may be defined for triggering a resource reselection. Wireless communications systems may often employ transmit beamforming to effectively transmit and receive information. It may be desirable to introduce triggering conditions for resource reselection when a beam changes in a wireless communications system. Reselecting resources upon determining a change in transmit beams may result in high reliability and low latency.

According to one or more aspects of the present disclosure, the wireless communications system 100 may be configured to support resource reselecting associated with beamforming. A UE 115 may receive an indication of an allocation of resources for sidelink communication on a set of directional beams. In some examples, the UE 115 may utilize at least one transmit beam to perform sidelink communications. The UE 115 may identify a beam change condition for the set of directional beams based on a beam change condition configuration. In some examples, the beam change condition configuration may be based on a capability of the UE 115 to support a beam change. According to some examples, the UE 115 may perform a resource reselection procedure for updating the allocation of resources for sidelink communication based on the beam change condition and the beam change condition configuration.

Figure 2:
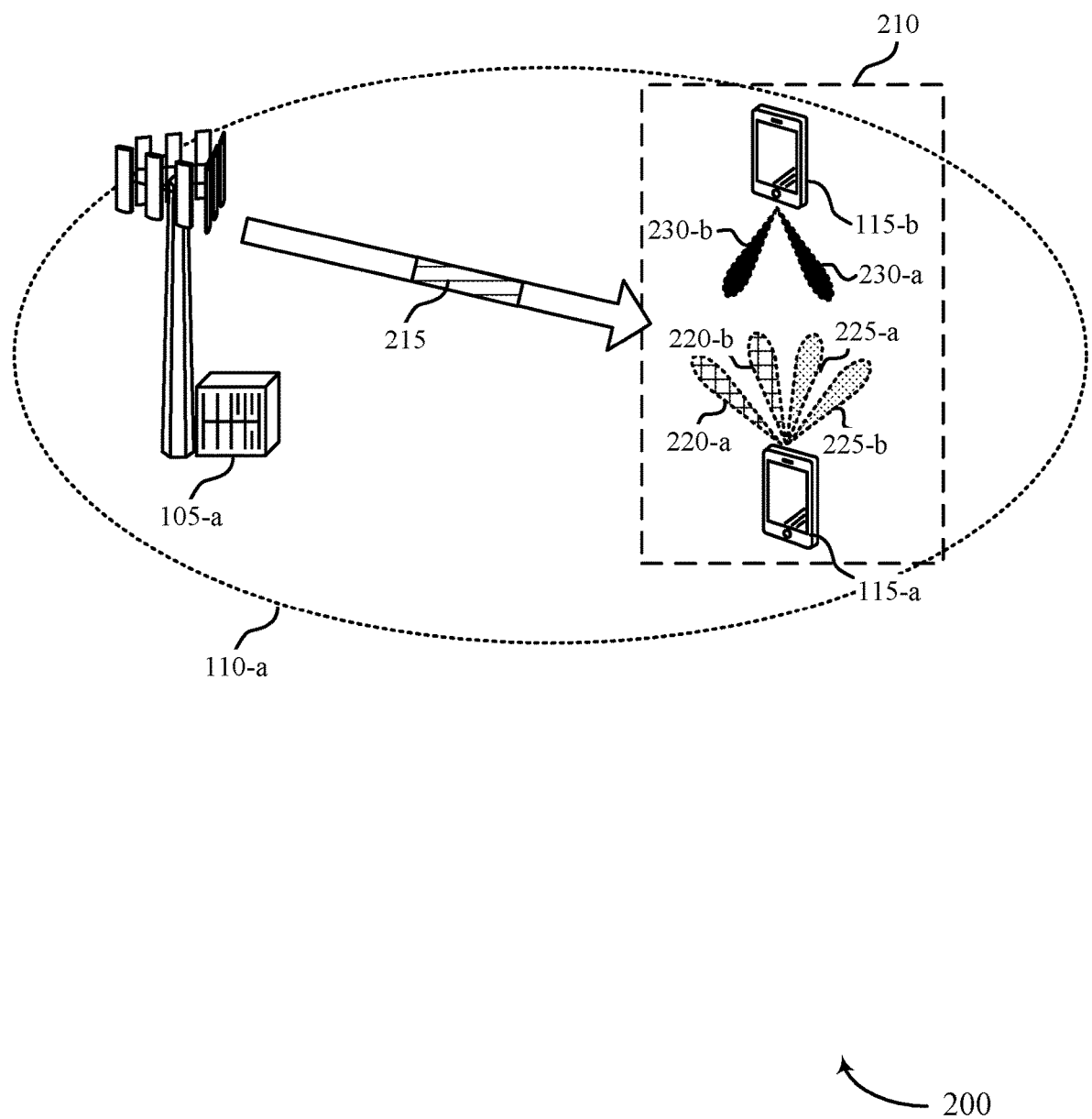
FIG. 2 illustrates an example of a wireless communications system that supports resource reselection trigger with beamforming in accordance with aspects of the present disclosure.

FIG. 2 illustrates an example of a wireless communications system 200 that supports resource reselection trigger with beamforming in accordance with aspects of the present disclosure. In some examples, the wireless communications system 200 may implement aspects of wireless communications system 100. The wireless communications system 200 includes base station 105-a, geographic coverage area 110-a, and one or more UEs 115. In some cases, the wireless communications system 200 may utilize control signaling including grants to schedule resources for UEs 115 to perform sidelink communications. Additionally or alternatively, the UEs 115 in the wireless communications system 200 may utilize shared information to enhance scheduling, inter-UE coordination, and communications flexibility. In some examples, the group of UEs 115 (e.g., UE 115-a and UE 115-b) may communicate with each other (e.g., within a V2X system, a D2D system, and the like) and may employ sidelink transmissions to save power, reduce latency, and ensure reliable communications. In some examples, vehicles may communicate using various V2X resource allocation modes. As described in more detail below, UE 115-a and UE 115-b may identify a beam change condition and may perform a resource reselection procedure for updating an allocation of resources for sidelink communication based on the beam change condition and a beam change condition configuration.

The wireless communications system 200 may support both access links and sidelinks for communications between one or more communication devices. An access link may refer to a communication link between a UE 115 (such as UE 115-a or UE 115-b) and a base station 105-a. A sidelink may refer to any communication link between similar wireless devices (e.g., a communication link between UEs 115, or a backhaul communication link between base stations 105). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE 115 to one or more other UEs 115. In some examples, base stations 105 (such as base station 105-a) may include one or more panels and/or multiple transmission and/or reception points. Additionally or alternatively, one or more UEs 115 (e.g., UE 115-a and UE 115-b) may include one or more panels or subarrays for performing wireless communications.

Base station 105-a may communicate with one or more UEs 115 (e.g., UEs 115-a and 115-b), which may be included within a UE group 210. For example, base station 105-a may transmit control information to UE 115-a or UE 115-b. As depicted in the example of FIG. 2, the UE 115-a and the UE 115-b may communicate with each other (or with another group of UEs 115) over sidelink communications (e.g., using a P2P or D2D protocol). In some cases, the UE 115-a may transmit sidelink transmissions to the UE 115-b. In some examples, the UE 115-a or the UE 115-b may monitor resource pools for the sidelink communications or indications of the sidelink communications (e.g., resource reservations, control channel transmissions, among other examples) from other UEs 115 in the group. Additionally or alternatively, the UEs 115 may have data to transmit to (or receive from) one or more of the UEs 115 in the group and may use the sidelink communications to transmit the data. In some examples, the group of UEs 115 may utilize sidelinks in addition to access links with the base station 105-a.

In some examples, sidelink communications may support communications within a group of UEs 115 (e.g., UE group 210). For instance, sidelink communications may include communications between a UE 115 (such as UE 115-a or UE 115-b) and other UEs 115 within a coverage area including the group of UEs 115 (e.g., a coverage area provided by a base station 105, a coverage area outside of the coverage area provided by the base station 105, or a combination thereof). One or more of the UEs 115 in the group of UEs 115 may initiate sidelink communications with other UEs 115 in the group of UEs 115. For example, one or more of the UEs 115 may be in a coverage area 110-a (e.g., a coverage area 110 with reference to FIG. 1) of the base station 105-a. In such examples, a UE 115 may communicate with the base station 105-a via a Uu interface (e.g., the base station 105-a may transmit downlink communications to one or more of the UEs 115 via an access link). In some other examples, the group of UEs 115 may not be inside the coverage area or may not communicate with the base station 105-*a* using an access link.

In some cases, a UE 115 (such as, UE 115-*a* and UE 115-*b*) may have information (e.g., a detection of an object or obstacle on a road in a V2X system, scheduling information, among other examples) to transmit to the group of UEs 115, and the UE 115 may initiate sidelink communications including the information to the other UEs 115. In such cases, the UE 115 initiating the sidelink communications may be referred to as a transmitting UE 115 and the UE 115 receiving the sidelink communications may be referred to as a receiving UE 115. In some examples, the base station 105-*a* may configure sidelink communication resources for the group of UEs 115 using a configuration message (e.g., semi-persistent scheduling configuration message). In one example, the base station 105-*a* may communicate a control signaling 215 indicating a resource allocation for one or more UEs 115 included in the group of UEs 115. Additionally or alternatively, the base station 105-*a* may communicate the control signaling 215 indicating an allocation of resources for sidelink communication on a set of directional beams (e.g., beams 220, 225, etc.).

In some wireless communications systems, a UE 115 from the group of UEs 115 may be allowed to select sidelink transmission resources. In some examples, NR V2X communication may support two modes of resource allocation: Mode 1 (where the resource is scheduled by a base station) and Mode 2 (where the UE 115 performs an autonomous resource selection). In the wireless communications system 200, a transmitter (e.g., base station 105-*a*) and a receiver (e.g., UE 115-*a*) may perform beam management operations. Additionally or alternatively, the UEs 115 within the UE group 210 may perform sidelink communications using one or more directional beams. In some example, a transmitter (e.g., base station 105-*a* or UE 115-*a*) may engage in a beam sweeping operation to establish an active transmit beam with a receiver (e.g., UE 115-*b*) or in a beam tracking operation to maintain a connection with the receiver (e.g., UE 115-*b*).

In some examples, the wireless communications system 200 may operate in mmW frequency ranges. Such frequency ranges may be associated with beamformed transmissions between the base station 105-*a* and the UEs 115. Additionally, sidelink communications between the UE 115-*a* and the UE 115-*b* may be performed using beamformed transmissions. For example, the wireless communications system 200 may use signal processing techniques, such as beamforming to combine energy coherently and overcome path losses.

As described in the example of FIG. 2, a UE 115-*a* may include multiple antennas. In some cases, each antenna may transmit a phase-shifted version of a signal such that the phase-shifted versions constructively interfere in some regions and destructively interfere in others. In some cases, weights may be applied to the various phase-shifted versions (e.g., in order to steer the transmissions in a desired direction). Such techniques may serve to increase the strength of the signal transmitted by the UE 115-*a* or otherwise benefit the wireless communications system 200. Transmit beams 220-*a*, 220-*b*, 225-*a* and 225-*b* represent examples of beams over which information may be transmitted. In some cases, the transmit beams 220-*a*, 220-*b*, 225-*a* and 225-*b* may also be referred to as transmitter beams. According to one or more aspects of the present disclosure, each transmit beam (e.g., the transmit beams 220-*a*, 220-*b*, 225-*a* and 225-*b*) may be directed from the UE 115-*a* toward a different region of the coverage area 110-*a* and in some cases, two or more beams (e.g., the transmit beams 220-*a*, 220-*b*, 225-*a* and 225-*b*) may overlap. Transmit beams 220-*a*, 220-*b*, 225-*a* and 225-*b* may be transmitted simultaneously or at different times. In either case, a UE 115-*b* may be capable of receiving one or more of the transmit beams 220-*a*, 220-*b*, 225-*a* and 225-*b* via respective receive beams 230-*a* and 230-*b*. In some examples, the receive beams 230-*a* and 230-*b* may also be referred to as receiver beams. According to one example, the UE 115-*b* may measure one or more of the transmitter beams 220-*a*, 220-*b*, 225-*a* and 225-*b* using the receiver beams 230-*a* and 230-*b*.

In one example, the UE 115-*b* may form one or more receive beams 230-*a*, 230-*b* (which may also be referred to as receiver beams). Similar to the UE 115-*a*, the UE 115-*b* may also include multiple antennas. The receiver beams 230-*a* and 230-*b* may each correspond to one of the transmitter beams 220-*a*, 220-*b*, 225-*a* and 225-*b* (e.g., the UE 115-*b* may be positioned within wireless communications systems 200 such that UE 115-*b* receives beamformed transmit beams). In some cases, the UE 115-*b* may receive a subset of the transmit beams 220-*a*, 220-*b*, 225-*a* and 225-*b*. In some cases, the UE 115-*b* may receive (e.g., using receive beams) a single transmit beam (e.g., one of the transmit beams 220-*a*, 220-*b*, 225-*a* and 225-*b*). In some examples, the UE 115-*b* may receive one or more transmit beams with various path loss and multipath effects included. That is, each antenna of the UE 115-*b* may receive the transmit beam which has experienced different path losses or phase shifts (e.g., different phase shifts may be due to the different path lengths between the UE 115-*a* and the respective antennas of the UE 115-*b*) and appropriately combine the received signals represented by receive beam. In some examples, the UE 115-*a* may engage in a beam sweeping operation to establish an active transmit beam with the UE 115-*b*. In some examples, the UE 115-*a* may also engage in a beam tracking procedure to maintain a connection with the UE 115-*b*. In some examples, the UE 115-*a* and the UE 115-*b* may perform a beam management operation, which may include beam selection (including beam sweeping and beam tracking), beam refinement, beam establishment, or a combination thereof. Additionally or alternatively, the UEs 115 (such as the UE 115-*a* and the UE 115-*b*) may engage in a beam management operation with the base station 105-*a*.

In some examples, the UE 115-*a* may perform transmission resource reselection while communicating with the UE 115-*b*. In some cases, the UE 115-*a* may perform resource reselection if one or more conditions are triggered. That is, a list of conditions may trigger resource selection or reselection by a transmitter UE 115 performing sidelink communications. In some examples, the list of conditions may include determining that a pool of resources is configured or reconfigured by upper layers, determining that there is no configured sidelink grant to be used by the transmitter UE 115, determining that neither transmission nor retransmission has been performed by a MAC entity on any resource indicated in the configured sidelink grant during a prior time period (e.g., the last one second), or any combination thereof.

According to one or more aspects, a transmitter UE 115 (such as the UE 115-*a*) may identify various parameters (e.g., sl-ReselectAfter, sl-MaxMCS-PSSCH, etc.). In one example, the UE 115-*a* may perform resource reselection if sl-ReselectAfter is configured and the number of consecutive unused transmission opportunities on resources indicated in the configured sidelink grant is equal to sl-ReselectAfter. Additionally or alternatively, the UE 115-*a* may perform resource reselection if the configured sidelink grant cannot accommodate an RLC service data unit by using a maximum allowed modulation and coding scheme configured by upper layers in sl-MaxMCS-PSSCH, and if the MAC entity selects to not segment the RLC service data unit. Additionally or alternatively, the UE 115-a may perform a resource reselection procedure if transmission(s) with the configured sidelink grant cannot fulfil a latency requirement of data in a logical channel according to an associated priority. In such cases, the UE 115-a may determine that the MAC entity has selected to not perform transmission(s) corresponding to a single MAC protocol data unit.

A wireless communication system operating with transmit beamforming may include either digital beamforming, analog beamforming, mixed beamforming, or a combination thereof. In some cases, a transmission may impact system usage or an interference level in a specific direction, which is different from non-beamforming based transmission. In some cases, there may be a beam change between a transmitter and receiver pair (such as between the UE 115-a and the UE 115-b). For example, a transmitter and receiver pair (such as between the UE 115-a and the UE 115-b) may experience either a transmitter beam change, a receiver beam change, or both. In some examples, the transmitter and receiver pair (such as between the UE 115-a and the UE 115-b) may also experience a direction change for a given transmit beam and receive beam pair. For example, a transmit beam and receive beam pair may refine the transmit beam or the receive beam or both beams within a wider beam. To account for such beam changes, there is a need to introduce triggering conditions for resource reselection when a beam changes in a wireless communications system (such as wireless communications system 200).

According to one or more aspects of the present disclosure, the UE 115-a may receive an indication (e.g., control signaling 215) of an allocation of resources for sidelink communication on a set of directional beams. In some examples, the sidelink communication may be associated with licensed spectrum or unlicensed spectrum. As depicted in the example of FIG. 2, the set of directional beams may include the transmit beams 220-a and 220-b. In some cases, the UE 115-a may transmit, to the base station 105-a, a capability of the UE to support a beam change. In some cases, a beam change condition configuration may be based on the capability of the UE 115-a. In some examples, the UE 115-a may identify a beam change condition for the set of directional beams based on a beam change condition configuration. The beam change condition may include one or more of receiving instructions from the base station 105-a to change a beam of the set of directional beams, autonomously changing a beam of the set of directional beams, or a combination thereof. The UE 115-a may then perform a resource reselection procedure for updating the allocation of resources for sidelink communication based on the beam change condition and the beam change condition configuration. According to some aspects, the UE 115-a may identify a resource reselection procedure trigger that indicates the beam change condition as a trigger for performing the resource reselection procedure.

In some examples, the UE 115-a may initially select the transmit beam 220-a to perform sidelink communications with the UE 115-b. The UE 115-a may then identify a time window associated with the allocation of resources for the sidelink communications. For example, a time window can be pre-defined or configured by the base station 105-a. That is, the UE 115-a may receive signaling indicating a time window configuration associated with the time window. At the beginning of the time window, a set of beams (that are associated with a transmission configuration indicator (TCI) state or a spatial relationship) may be used for resource selection or as a set of reference beam(s). In the example of FIG. 2, the UE 115-a may select a set of beams (including the transmit beams 220-a and 220-b) at the beginning of a time window. Although multiple beams are included in the set of beams, it may be understood that the set of beams may include one beam. That is, some devices (such as the UE 115-a) may just use a single beam for a given transmit and receive pair for transmission at a given time. On the other hand, some devices may support more than one beam for a given transmit and receive pair. In some examples, the UE 115-a may perform the resource reselection procedure upon expiration of the time window. For instance, the UE 115-a may determine that the time window has expired, and upon determining the expiration of the time window, the UE 115-a may select a new transmit beam (such as the transmit beam 225-a) or otherwise trigger resource reselection procedure. In some cases, the resource reselection can be triggered when a transmitter (such as the UE 115-a) intends to change a transmit beam direction, a beam-width, or both after expiration of the time window.

According to one or more aspects, the UE 115-a may identify a metric associated with the beam change condition configuration. In some examples, the UE 115-a may receive signaling indicating a configuration associated with the metric. In one example, the metric may quantify at least one of a directional change with respect to a beam of the set of directional beams, a directional change between a center of a beam of the set of directional beams and a transmission direction, a set of subsets of directional beams, or a combination thereof. In some cases, the metric may be defined or configured to quantify a direction change with respect to one or more existing beams (e.g., using either a beam or set of reference beams at the beginning of the time window). In some examples, the UE 115-a may identify a change in a direction of the set of directional beams. The UE 115-a may also determine whether the direction change of the set of directional beams satisfies a threshold based on the metric. As described in the example of FIG. 2, the UE 115-a may determine that a transmit beam has changed from the transmit beam 220-a to the transmit beam 225-a. In some examples, the UE 115-a may determine whether a directional change between the transmit beam 220-a and the transmit beam 225-a satisfies a threshold. In some examples, the UE 115-a may determine whether a center of the beam between the original transmission direction and intended new transmission direction is more than a threshold. The threshold may either be pre-defined or configured according to the set of directional beams. In some cases, the UE 115-a may perform the resource reselection procedure upon determining that the directional change of the set of directional beams satisfies the threshold.

In some examples, the UE 115-a may identify a set of subsets of directional beams based on the metric. In the example of FIG. 2, the transmit beams 220-a and 220-b may be included in a first subset of directional beams and the transmit beams 225-a and 225-b may be included in a second subset of directional beams. According to some aspects, the UE 115-a may perform the resource reselection procedure upon determining a change in a beam of the set of directional beams from a first subset to a second subset of the set of subsets of directional beams. For example, the UE 115-a may determine that a transmit beam has changed from the transmit beam 220-a to the transmit beam 225-a. The UE 115-a may determine that the transmit beam 220-a and the transmit beam 225-a belong to different subsets. In such cases, the UE 115-a may choose to perform a resource reselection procedure based on switching the beam from the transmit beam 220-a to the transmit beam 225-a. Thus, the one or more aspects of the present disclosure provide for one or more triggering conditions for resource reselection when a beam changes in a wireless communications system.

In some examples, one or more subsets of beams may be configured by the UE 115-a, or be recommended by the UE 115-a to another device such as a base station 105-a or a scheduling UE 115. In some examples, the base station 105-a or the scheduling UE 115 may then configure the subsets for the UE 115-a, for example, as part of the initial beam and resource assignment, either directly following a recommendation of the scheduling UE 115 or based on additional inputs such as reports from other UEs 115. In some examples, all beams within a subset may be associated with a similar set of beam directions, whereas different subsets may have different directions. Thus, an effect similar to triggering resource reselection when the transmit beam direction changes more than a certain threshold could be achieved by configuring the subsets accordingly, without the UE 115-a having to report the precise beam direction. The resource (re)selection may be performed in unlicensed or shared spectrum as a form of contention resolution. It may be performed in licensed spectrum, for example, among UEs 115 that are out of coverage or experiencing poor coverage (e.g., due to temporary blocking or gaps in coverage).

In some cases, a change of transmit beam direction (e.g., for transmitting to a different recipient UE 115) may result in a different set of UEs 115 being affected by interference from the transmit beam, and thus a different resource may be selected to minimize this interference. The resource reselection may also avoid occupying a resource that another UE is using. In beamformed systems, multiple UEs 115 may occupy the same resource for transmission as long as their beams are spatially-separable at their respective recipient UEs 115 (the recipients may be the same or different). The spatial separation condition may be re-evaluated when the transmit beam is changed. In some cases, the receiver beam to be used to sense whether the resource is occupied by other UEs 115 may also be changed when the transmit beam is changed. Thus, resource re-selection triggering based on beam changes allows such re-evaluations and results in improvement in overall system efficiency, such as lower resource collisions, lower interference, and higher throughput, among other benefits. In an example of beam change, or in addition to beam-change, such re-selection may also be triggered based on a change in transmit power level exceeding a threshold. The change in transmit power may be measured across successive transmissions without regard to whether the transmissions were associated with the same transmit beam. Alternatively, the change in transmit power may be measured across a current and a prior (e.g., most recent previous) instance of the same transmit beam. In some examples, the threshold may be deemed to have been exceeded if the same transmit beam had not been used previously, or the time between previous and current use exceeds a threshold.

Figure 3:
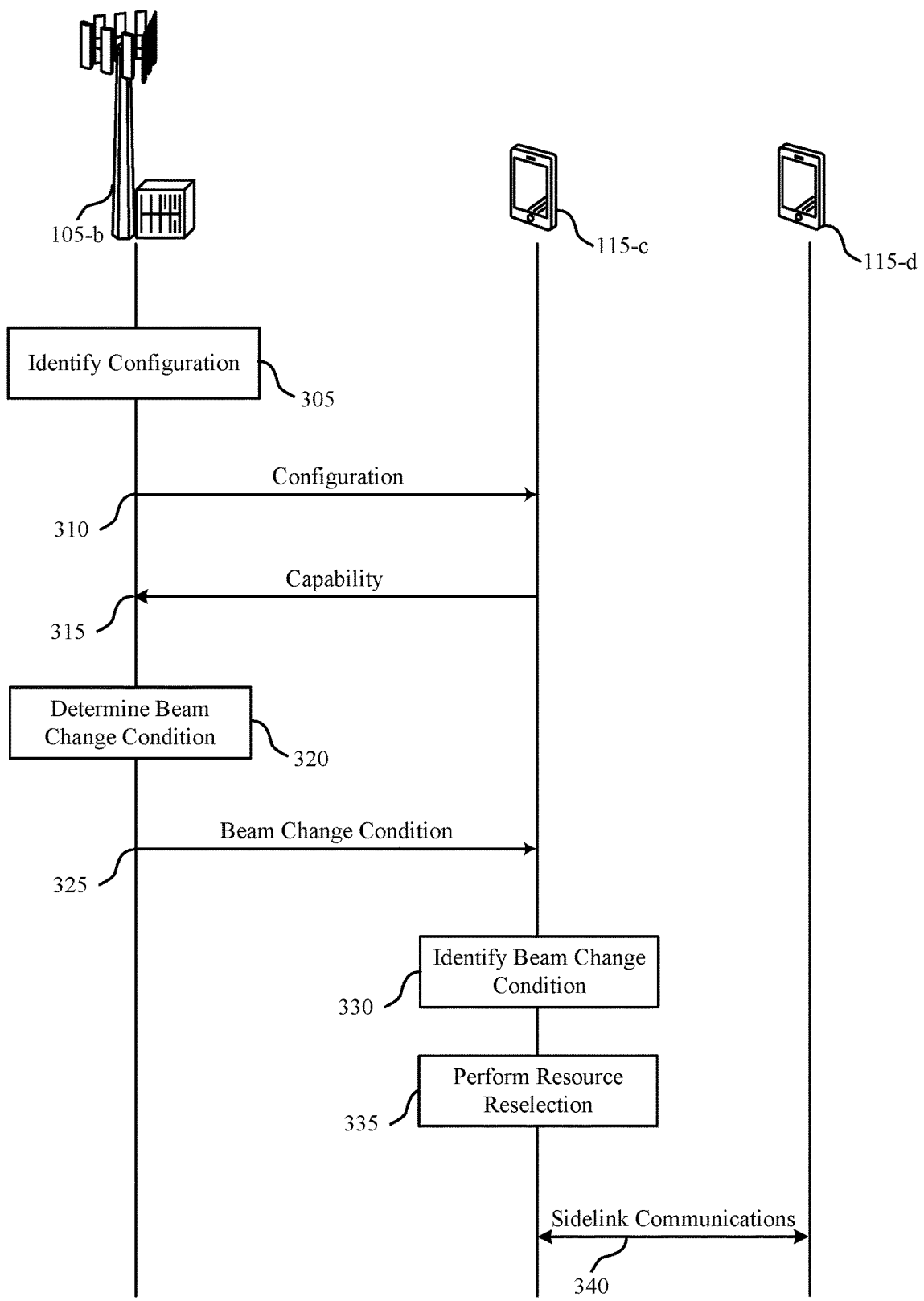
FIG. 3 illustrates an example of a process flow that supports resource reselection trigger with beamforming in accordance with aspects of the present disclosure.

FIG. 3 illustrates an example of a process flow 300 that supports resource reselection trigger with beamforming in accordance with aspects of the present disclosure. In some examples, the process flow 300 may implement aspects of the wireless communications system 100 and 200 described with reference to FIGS. 1 and 2, respectively. For example, the process flow 300 may be based on one or more rules for triggering resource reselection when a beam changes in a wireless communications system. The process flow 300 may be implemented by the UE 115-c, the UE 115-d and the base station 105-b for reduced power consumption, and may promote low latency and low interference for wireless communications supporting high priority channels, among other benefits. The base station 105-b, the UE 115-c, and the UE 115-d may be examples of a base station 105 and a UE 115, as described with reference to FIGS. 1 and 2.

In the following description of the process flow 300, the operations between the base station 105-b, the UE 115-c, and the UE 115-d may be transmitted in a different order than the example order shown, or the operations performed by the base station 105-b, the UE 115-c, and the UE 115-d may be performed in different orders or at different times. Some operations may also be omitted from the process flow 300, and other operations may be added to the process flow 300.

At 305, the base station 105-b may identify a configuration for sidelink communications for the UE 115-c. In some examples, the configuration may be for a set of occasions configured for sidelink communications for the UE 115-c. In some examples, the configuration may be associated with a resource grant. The resource grant may include an allocation of resources for sidelink communication on a set of directional beams. In some examples, the sidelink communication may be associated with licensed spectrum or unlicensed spectrum. In some examples, the set of directional beams may include one or more directional beams.

At 310, the base station 105-b may transmit, to the UE 115-c, the identified configuration. For example, the base station 105-b may transmit the indication of an allocation of resources for sidelink communication on a set of directional beams.

At 315, the UE 115-c may transmit, to the base station 105-b, a capability of the UE 115-c to support a beam change.

At 320, the base station 105-b may determine a beam change condition configuration. In some examples, the beam change condition configuration may be based on the capability of the UE. The beam change condition configuration may include one or more thresholds, metrics, or other parameters that indicate, to a UE, the conditions associated with a beam change that trigger a resource reselection procedure.

The base station 105-b may transmit a signaling indicating the beam change condition at 325. Although depicted as transmitting a signal, it may be understood that the base station 105-b may otherwise configure the UE 115-c to identify a beam change condition for the set of directional beams based on the beam change condition configuration.

At 330, the UE 115-c may identify a beam change condition for the set of directional beams based on the beam change condition configuration. As described with reference to FIG. 2, a beam change condition may include a change associated with transmitting on one or more beams (e.g., changing beam direction, changing beam size, selecting a new beam, etc.) that is initiated by the UE 115-c, the base station 105-b or some other entity. In one example, the UE 115-c may identify a resource reselection procedure trigger that indicates the beam change condition as a trigger for performing the resource reselection procedure. In some cases, the beam change condition signal at 325 may indicate a time window configuration associated with a time window. Based on the configuration, the UE 115-c may identify a time window associated with the allocation of resources for sidelink communication. Additionally or alternatively, the UE 115-c may identify a metric associated with the beam change condition configuration. In some examples, the metric may quantify at least one of a directional change with respect to a beam of the set of directional beams, a directional change between a center of a beam of the set of directional beams and a transmission direction, a set of subsets of directional beams, or a combination thereof.

In some examples, the UE 115-c may identify a change in a direction of the set of directional beams and may determine whether the change in the direction of the set of directional beams satisfies a threshold based on the metric. Additionally or alternatively, the UE 115-c may identify a set of subsets of directional beams based on the metric (such as a metric indicated by the base station 105-b).

At 335, the UE 115-c may perform a resource reselection procedure for updating the allocation of resources for sidelink communication based on the beam change condition and the beam change condition configuration. For example, the UE 115-c may perform the resource reselection procedure upon expiration of the time window determined at 330. Additionally or alternatively, the UE 115-c may perform the resource reselection procedure upon determining that the change in the direction of the set of directional beams satisfies the threshold. In some cases, the UE 115-c may perform the resource reselection procedure upon determining a change in a beam of the set of directional beams from a first subset to a second subset of the set of subsets of directional beams. At 340, the UE 115-c may perform sidelink communications with the UE 115-d. For example, the UE 115-c may perform sidelink communications with the UE 115-d on a set of resources selected based on a resource reselection procedure that was triggered by the beam change condition.

Figure 4:
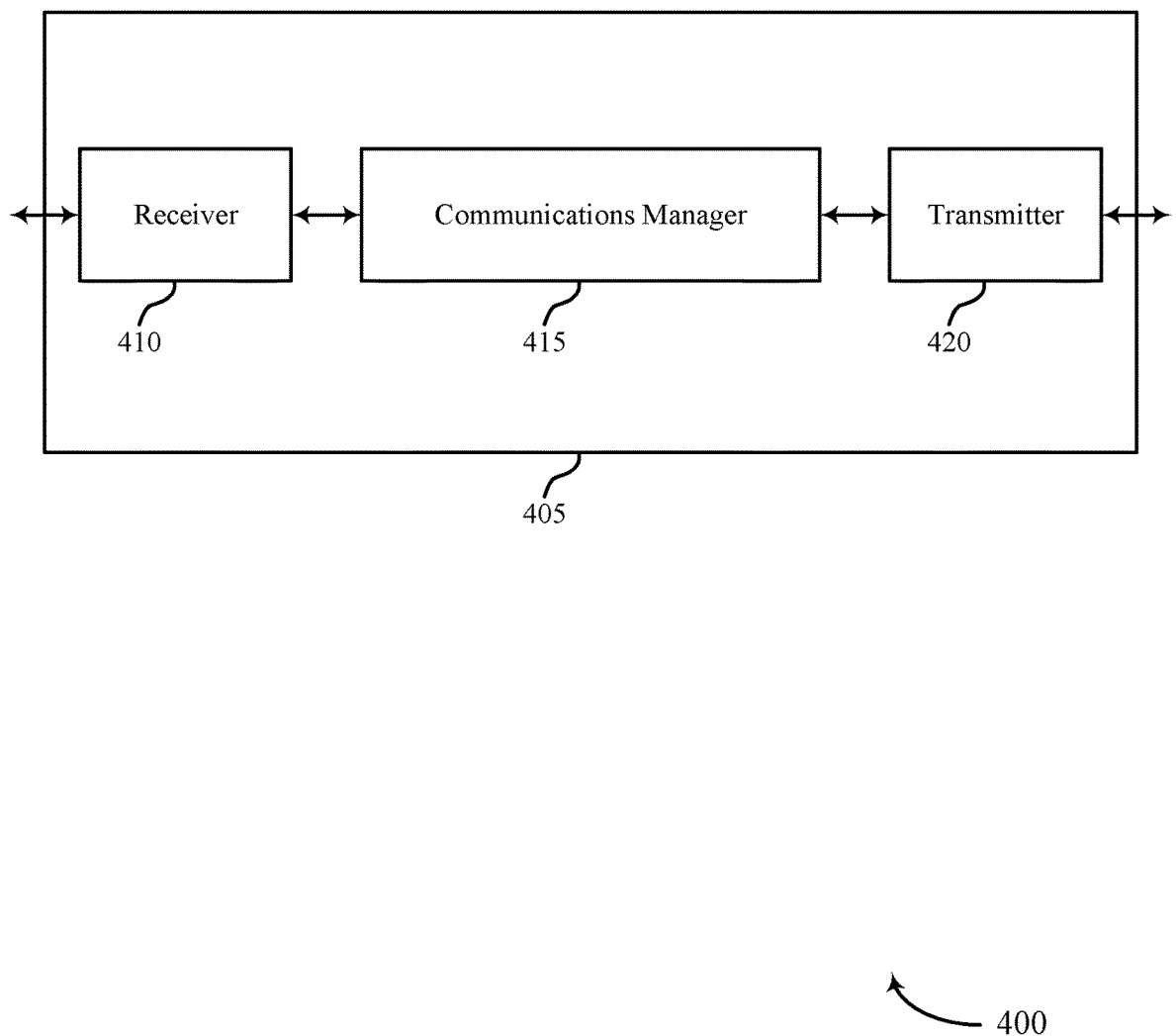
FIGS. 4 and 5 show diagrams of devices that support resource reselection trigger with beamforming in accordance with aspects of the present disclosure.

FIG. 4 shows a diagram 400 of a device 405 that supports resource reselection trigger with beamforming in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to resource reselection trigger with beamforming, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive an indication of an allocation of resources for sidelink communication on a set of directional beams, identify a beam change condition for the set of directional beams based on a beam change condition configuration, and perform a resource reselection procedure for updating the allocation of resources for sidelink communication based on the beam change condition and the beam change condition configuration. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

By including or configuring the communications manager 415 in accordance with examples described herein, the device 405 (e.g., a processor controlling or otherwise coupled to the receiver 410, the transmitter 420, or a combination thereof) may support techniques for reduced latency, enhanced reliability, and improved spectral efficiency based on performing a resource reselection procedure to update a resource allocation of the device 405 for sidelink communications.

Figure 5:
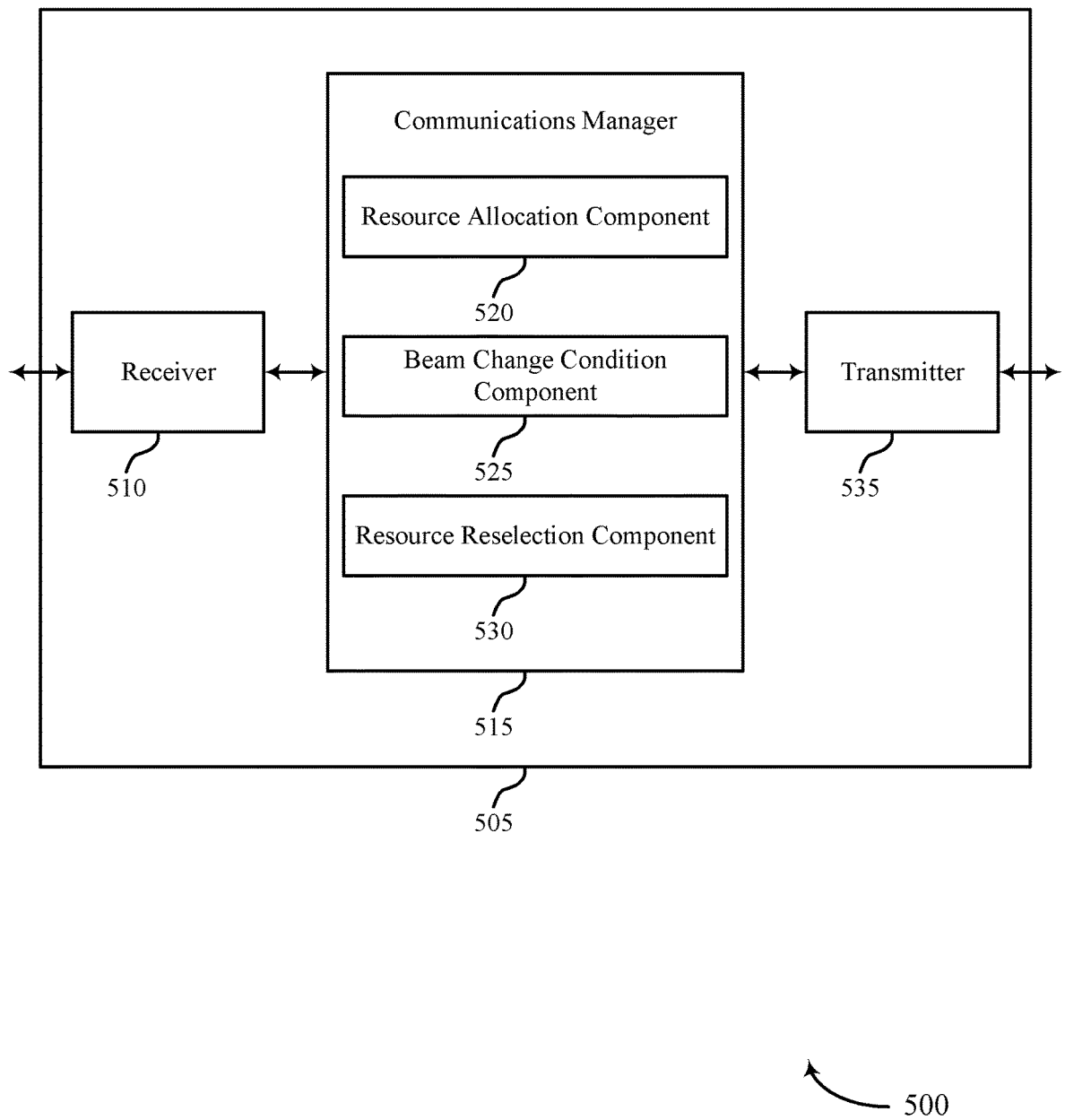

FIG. 5 shows a diagram 500 of a device 505 that supports resource reselection trigger with beamforming in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to resource reselection trigger with beamforming, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a resource allocation component 520, a beam change condition component 525, and a resource reselection component 530. The communications manager 515 may be an example of aspects of the communications manager 710 described herein.

The resource allocation component 520 may receive an indication of an allocation of resources for sidelink communication on a set of directional beams. The beam change condition component 525 may identify a beam change condition for the set of directional beams based on a beam change condition configuration. The resource reselection component 530 may perform a resource reselection procedure for updating the allocation of resources for sidelink communication based on the beam change condition and the beam change condition configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
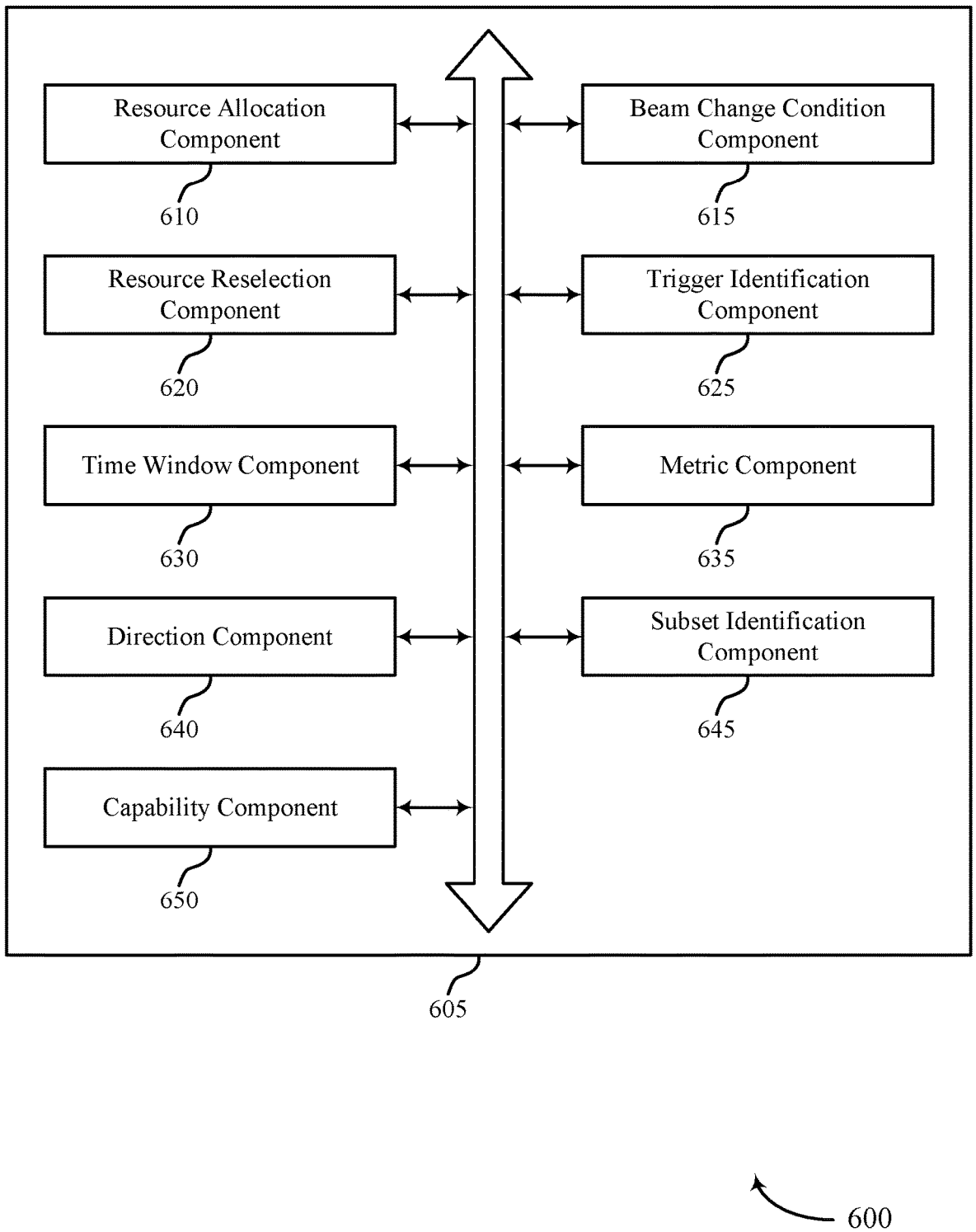
FIG. 6 shows a diagram of a communications manager that supports resource reselection trigger with beamforming in accordance with aspects of the present disclosure.

FIG. 6 shows a diagram 600 of a communications manager 605 that supports resource reselection trigger with beamforming in accordance with aspects of the present disclosure. The communications manager 605 may be an example of aspects of a communications manager 415, a communications manager 515, or a communications manager 710 described herein. The communications manager 605 may include a resource allocation component 610, a beam change condition component 615, a resource reselection component 620, a trigger identification component 625, a time window component 630, a metric component 635, a direction component 640, a subset identification component 645, and a capability component 650. Each of these modules may communicate, directly or indirectly, with one another (e.g., via one or more buses).

The resource allocation component 610 may receive an indication of an allocation of resources for sidelink communication on a set of directional beams. In some cases, the sidelink communication is associated with licensed spectrum or unlicensed spectrum. In some cases, the set of directional beams includes one or more directional beams.

The beam change condition component 615 may identify a beam change condition for the set of directional beams based on a beam change condition configuration. In some cases, the beam change condition includes one or more of receiving instructions from a base station to change a beam of the set of directional beams, autonomously changing a beam of the set of directional beams, or a combination thereof. The resource reselection component 620 may perform a resource reselection procedure for updating the allocation of resources for sidelink communication based on the beam change condition and the beam change condition configuration.

The trigger identification component 625 may identify a resource reselection procedure trigger that indicates the beam change condition as a trigger for performing the resource reselection procedure.

The time window component 630 may identify a time window associated with the allocation of resources for sidelink communication. In some examples, the time window component 630 may receive signaling indicating a time window configuration associated with the time window. In some examples, the resource reselection component 620 may perform the resource reselection procedure upon expiration of the time window.

The metric component 635 may identify a metric associated with the beam change condition configuration. In some examples, the metric component 635 may receive signaling indicating a configuration associated with the metric. In some cases, the metric quantifies one or more of a directional change with respect to a beam of the set of directional beams, a directional change between a center of a beam of the set of directional beams and a transmission direction, a set of subsets of directional beams, a change in power level of a directional beam, or a combination thereof.

The direction component 640 may identify a change in a direction of the set of directional beams. In some examples, the direction component 640 may determine whether the change in the direction of the set of directional beams satisfies a threshold based on the metric. In some examples, the resource reselection component 620 may perform the resource reselection procedure upon determining that the change in the direction of the set of directional beams satisfies the threshold. In some cases, the threshold is configured according to the set of directional beams.

The subset identification component 645 may identify a set of subsets of directional beams based on the metric. In some examples, the resource reselection component 620 may perform the resource reselection procedure upon determining a change in a beam of the set of directional beams from a first subset to a second subset of the set of subsets of directional beams.

The capability component 650 may transmit, to a base station, a capability of the UE to support a beam change, where the beam change condition configuration is based on the capability of the UE.

Figure 7:
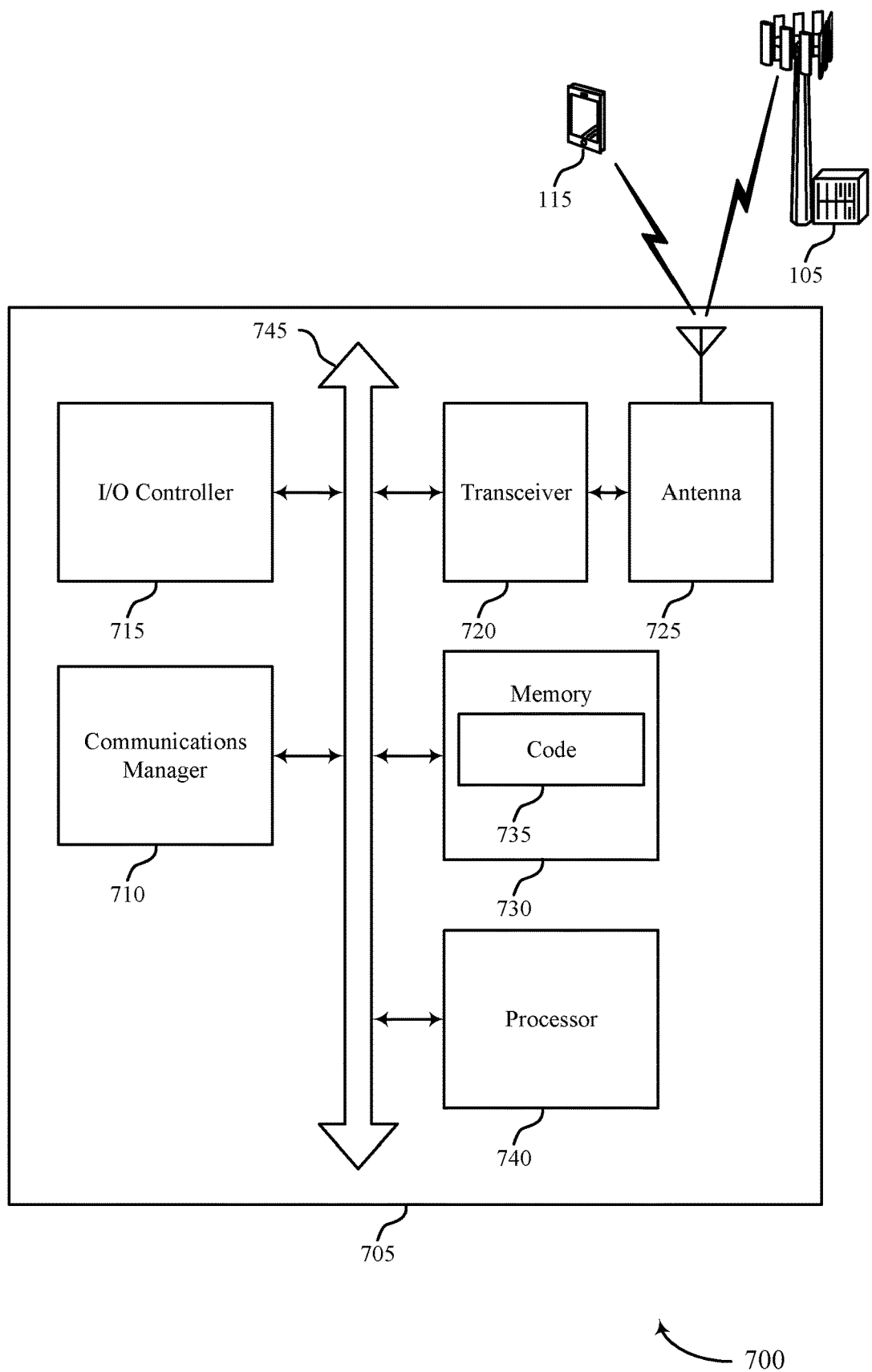
FIG. 7 shows a diagram of a system including a device that supports resource reselection trigger with beamforming in accordance with aspects of the present disclosure.

FIG. 7 shows a diagram of a system 700 including a device 705 that supports resource reselection trigger with beamforming in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive an indication of an allocation of resources for sidelink communication on a set of directional beams, identify a beam change condition for the set of directional beams based on a beam change condition configuration, and perform a resource reselection procedure for updating the allocation of resources for sidelink communication based on the beam change condition and the beam change condition configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting resource reselection trigger with beamforming).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
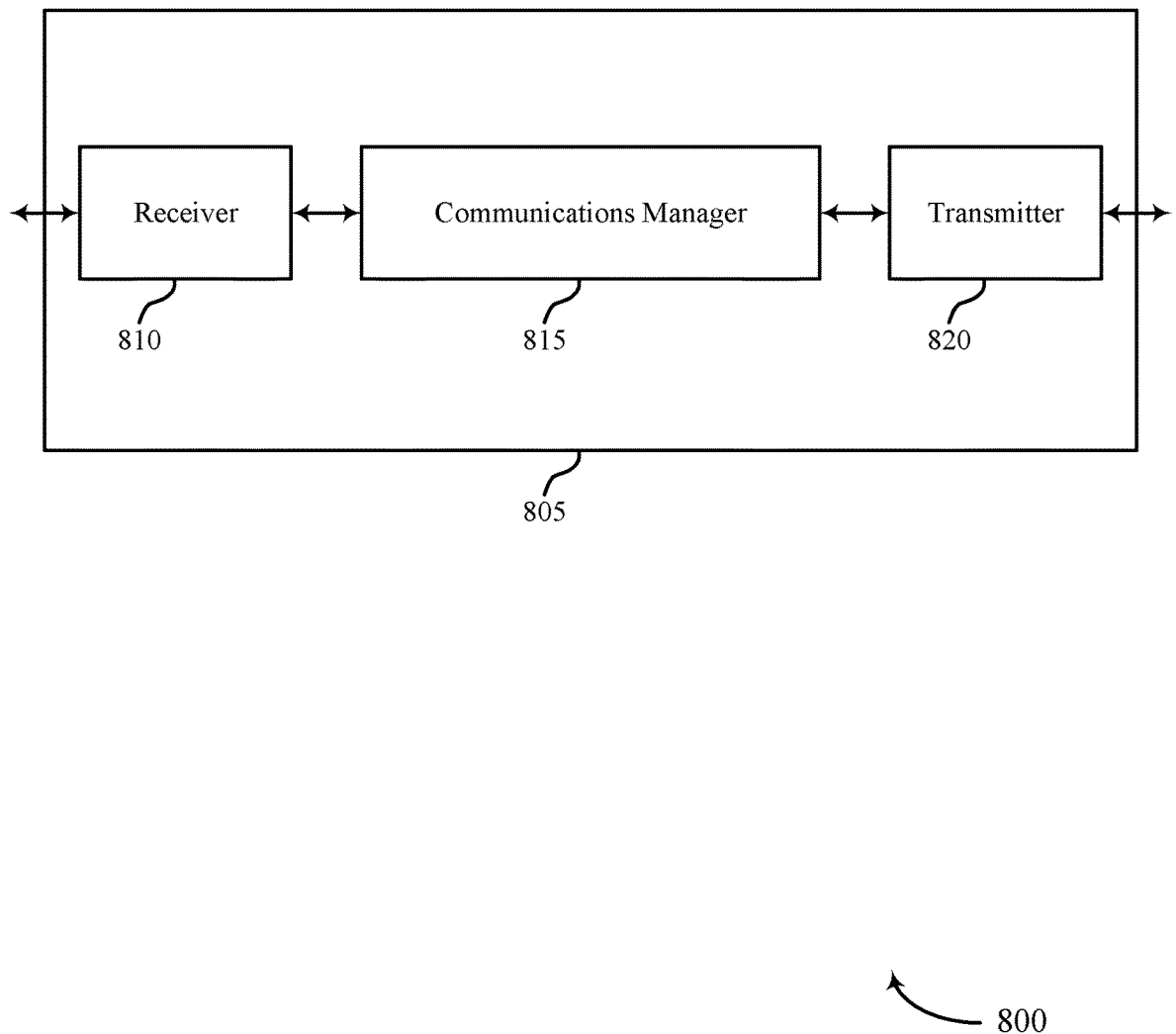
FIGS. 8 and 9 show diagrams of devices that support resource reselection trigger with beamforming in accordance with aspects of the present disclosure.

FIG. 8 shows a diagram 800 of a device 805 that supports resource reselection trigger with beamforming in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to resource reselection trigger with beamforming, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit an indication of an allocation of resources for sidelink communication on a set of directional beams, receive, from a UE, a capability of the UE to support a beam change, determine a beam change condition configuration based on the capability of the UE, and configure the UE to identify a beam change condition for the set of directional beams based on the beam change condition configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

By including or configuring the communications manager 815 in accordance with examples described herein, the device 805 (e.g., a processor controlling or otherwise coupled to the receiver 810, the transmitter 820, or a combination thereof) may support techniques for reduced latency, enhanced reliability, and improved spectral efficiency based on configuring a wireless device (e.g., a UE 115) with a beam change condition configuration for sidelink communications.

Figure 9:
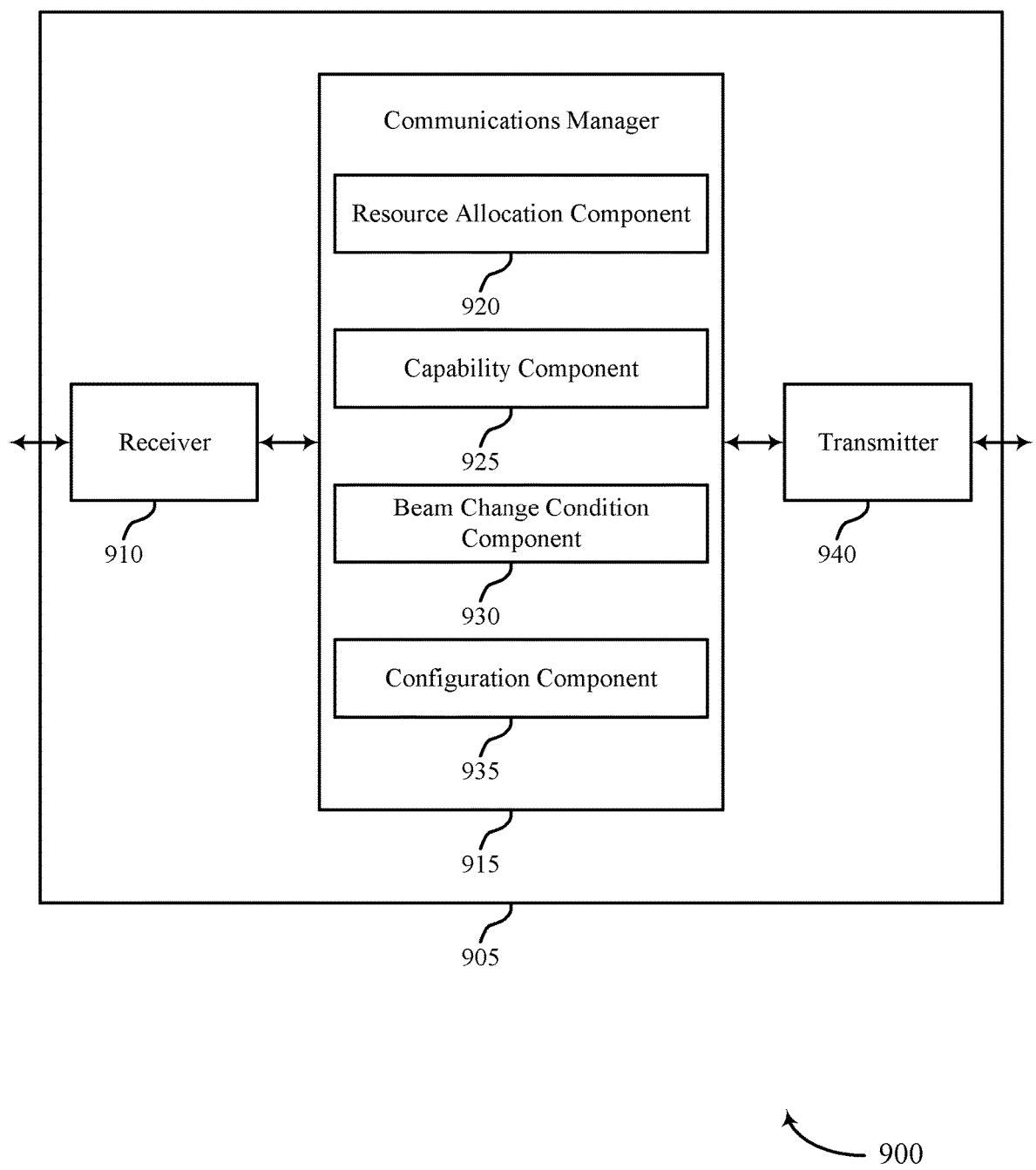

FIG. 9 shows a diagram 900 of a device 905 that supports resource reselection trigger with beamforming in accordance with aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to resource reselection trigger with beamforming, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a resource allocation component 920, a capability component 925, a beam change condition component 930, and a configuration component 935. The communications manager 915 may be an example of aspects of the communications manager 1110 described herein.

The resource allocation component 920 may transmit an indication of an allocation of resources for sidelink communication on a set of directional beams. The capability component 925 may receive, from a UE, a capability of the UE to support a beam change.

The beam change condition component 930 may determine a beam change condition configuration based on the capability of the UE. The configuration component 935 may configure the UE to identify a beam change condition for the set of directional beams based on the beam change condition configuration.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
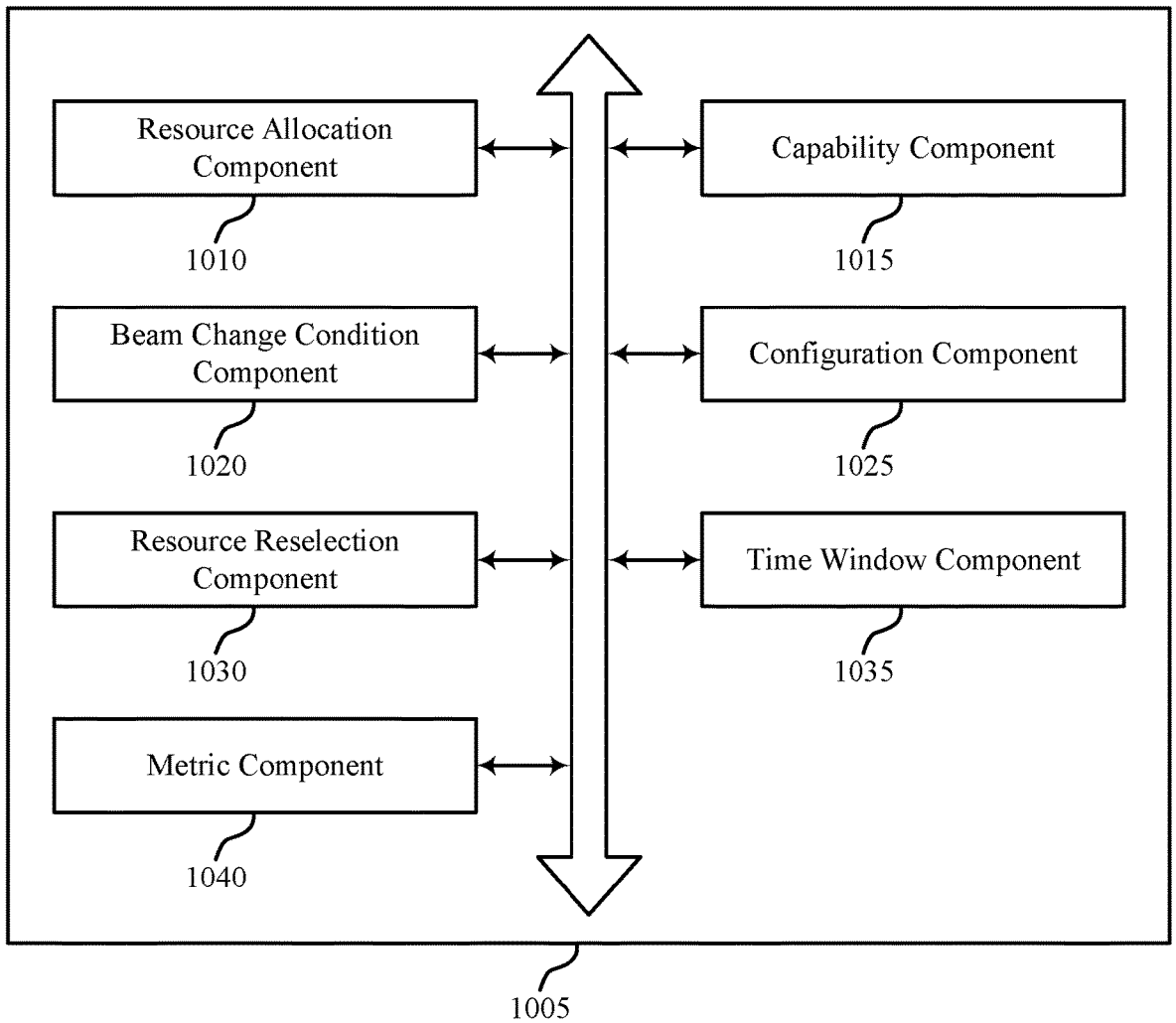
FIG. 10 shows a diagram of a communications manager that supports resource reselection trigger with beamforming in accordance with aspects of the present disclosure.

FIG. 10 shows a diagram 1000 of a communications manager 1005 that supports resource reselection trigger with beamforming in accordance with aspects of the present disclosure. The communications manager 1005 may be an example of aspects of a communications manager 815, a communications manager 915, or a communications manager 1110 described herein. The communications manager 1005 may include a resource allocation component 1010, a capability component 1015, a beam change condition component 1020, a configuration component 1025, a resource reselection component 1030, a time window component 1035, and a metric component 1040. Each of these modules may communicate, directly or indirectly, with one another (e.g., via one or more buses).

The resource allocation component 1010 may transmit an indication of an allocation of resources for sidelink communication on a set of directional beams. In some cases, the sidelink communication is associated with licensed spectrum or unlicensed spectrum. In some cases, the set of directional beams includes one or more directional beams.

The capability component 1015 may receive, from a UE, a capability of the UE to support a beam change. The beam change condition component 1020 may determine a beam change condition configuration based on the capability of the UE. In some cases, the beam change condition includes transmitting instructions to the UE to change a beam of the set of directional beams.

The configuration component 1025 may configure the UE to identify a beam change condition for the set of directional beams based on the beam change condition configuration. In some examples, the configuration component 1025 may configure the UE to perform a resource reselection procedure for updating the allocation of resources for sidelink communication based on the beam change condition and the beam change condition configuration.

The time window component 1035 may identify a time window associated with the allocation of resources for sidelink communication. In some examples, the time window component 1035 may determine a time window configuration associated with the time window. In some examples, the time window component 1035 may transmit signaling indicating the time window configuration associated with the time window. In some examples, the configuration component 1025 may configure the UE to perform a resource reselection procedure upon expiration of the time window.

The resource reselection component 1030 may identify a resource reselection procedure trigger that indicates the beam change condition as a trigger for performing the resource reselection procedure.

The metric component 1040 may identify a metric associated with the beam change condition configuration. In some examples, the metric component 1040 may determine a configuration associated with the metric.

In some examples, the metric component 1040 may transmit signaling indicating the configuration associated with the metric. In some cases, the metric quantifies one or more of a directional change with respect to a beam of the set of directional beams, a directional change between a center of a beam of the set of directional beams and a transmission direction, a set of subsets of directional beams, a change in power level of a directional beam, or a combination thereof.

Figure 11:
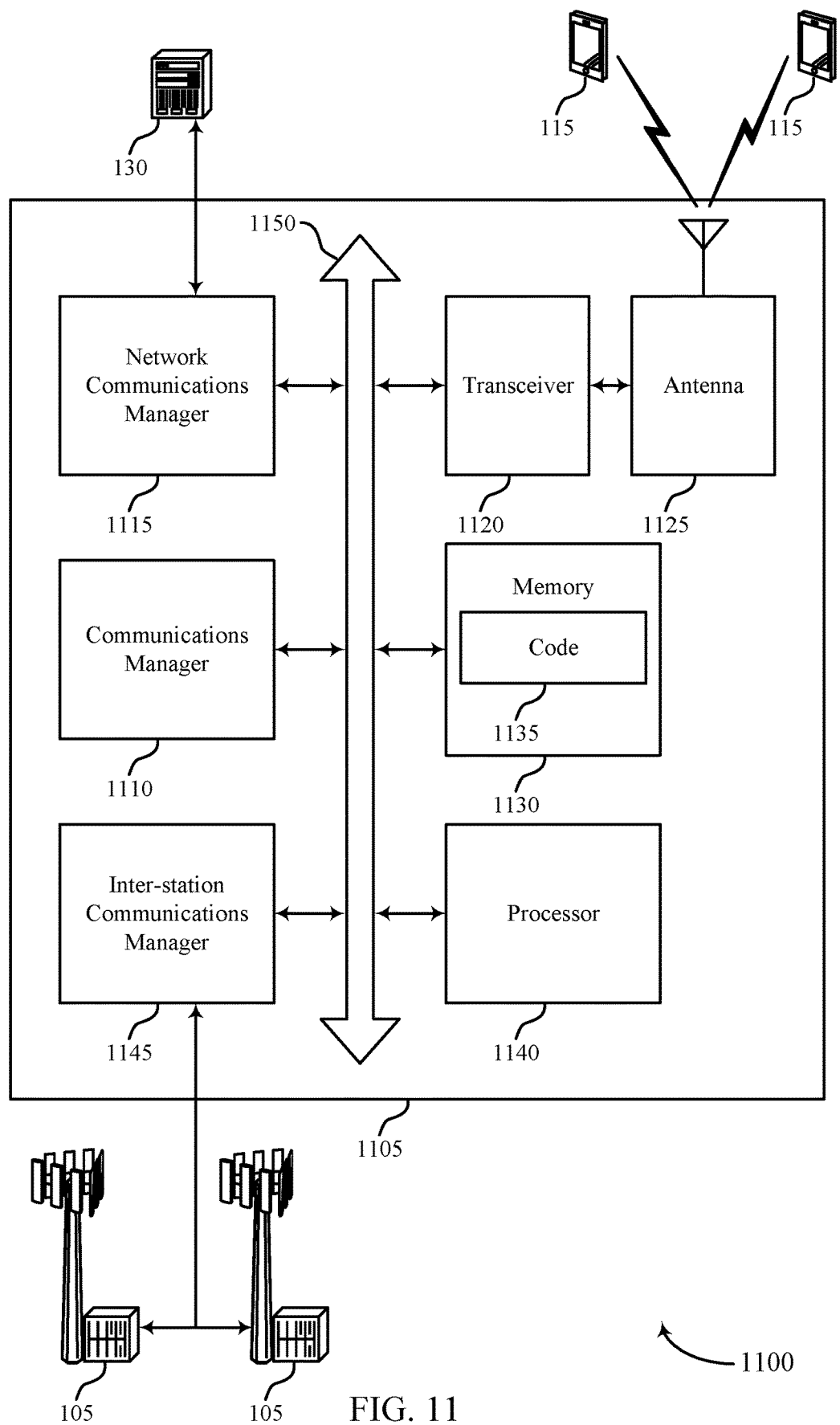
FIG. 11 shows a diagram of a system including a device that supports resource reselection trigger with beamforming in accordance with aspects of the present disclosure.

FIG. 11 shows a diagram of a system 1100 including a device 1105 that supports resource reselection trigger with beamforming in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit an indication of an allocation of resources for sidelink communication on a set of directional beams, receive, from a UE, a capability of the UE to support a beam change, determine a beam change condition configuration based on the capability of the UE, and configure the UE to identify a beam change condition for the set of directional beams based on the beam change condition configuration.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting resource reselection trigger with beamforming).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
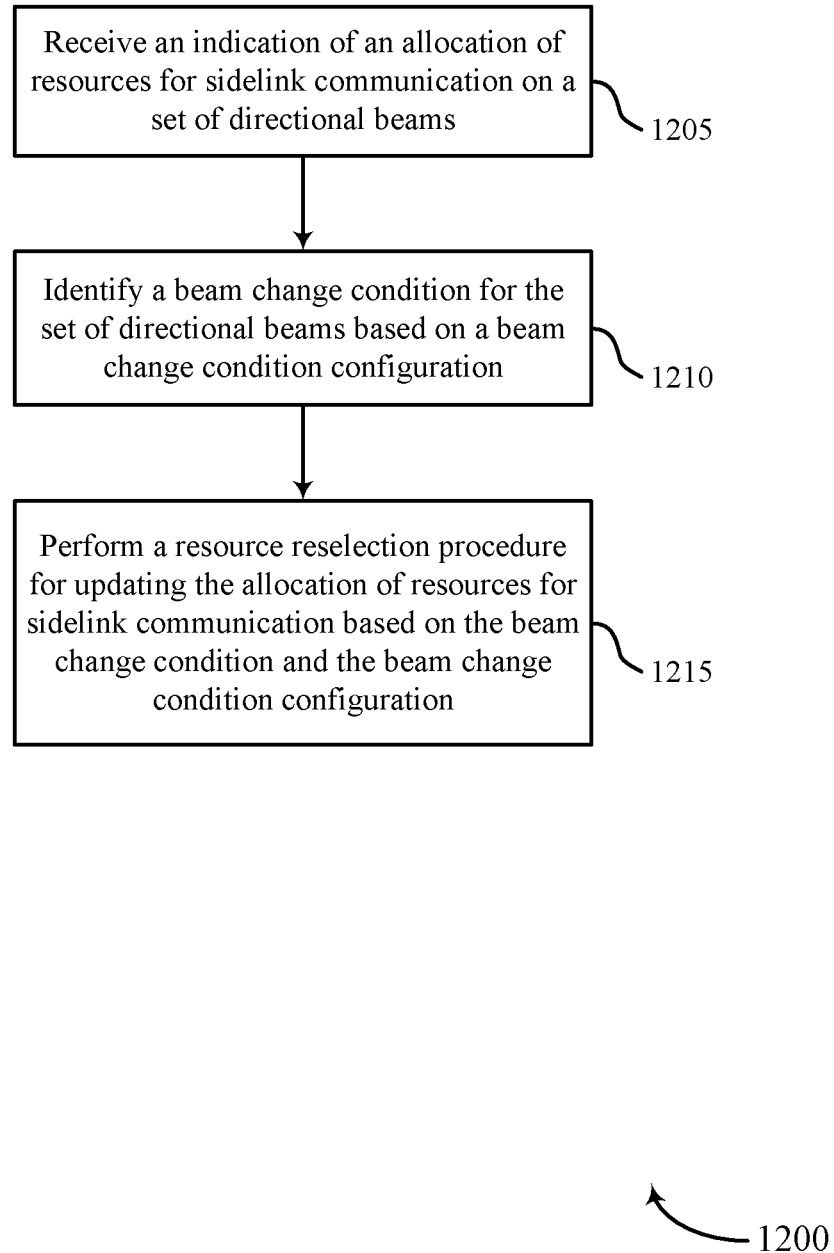
FIGS. 12 through 15 show flowcharts illustrating methods that support resource reselection trigger with beamforming in accordance with aspects of the present disclosure.

FIG. 12 shows a flowchart illustrating a method 1200 that supports resource reselection trigger with beamforming in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive an indication of an allocation of resources for sidelink communication on a set of directional beams. The operations of 1205 may be performed according to the methods described herein. In some examples, aspects of the operations of 1205 may be performed by a resource allocation component as described with reference to FIGS. 4 through 7.

At 1210, the UE may identify a beam change condition for the set of directional beams based on a beam change condition configuration. The operations of 1210 may be performed according to the methods described herein. In some examples, aspects of the operations of 1210 may be performed by a beam change condition component as described with reference to FIGS. 4 through 7.

At 1215, the UE may perform a resource reselection procedure for updating the allocation of resources for sidelink communication based on the beam change condition and the beam change condition configuration. The operations of 1215 may be performed according to the methods described herein. In some examples, aspects of the operations of 1215 may be performed by a resource reselection component as described with reference to FIGS. 4 through 7.

Figure 13:
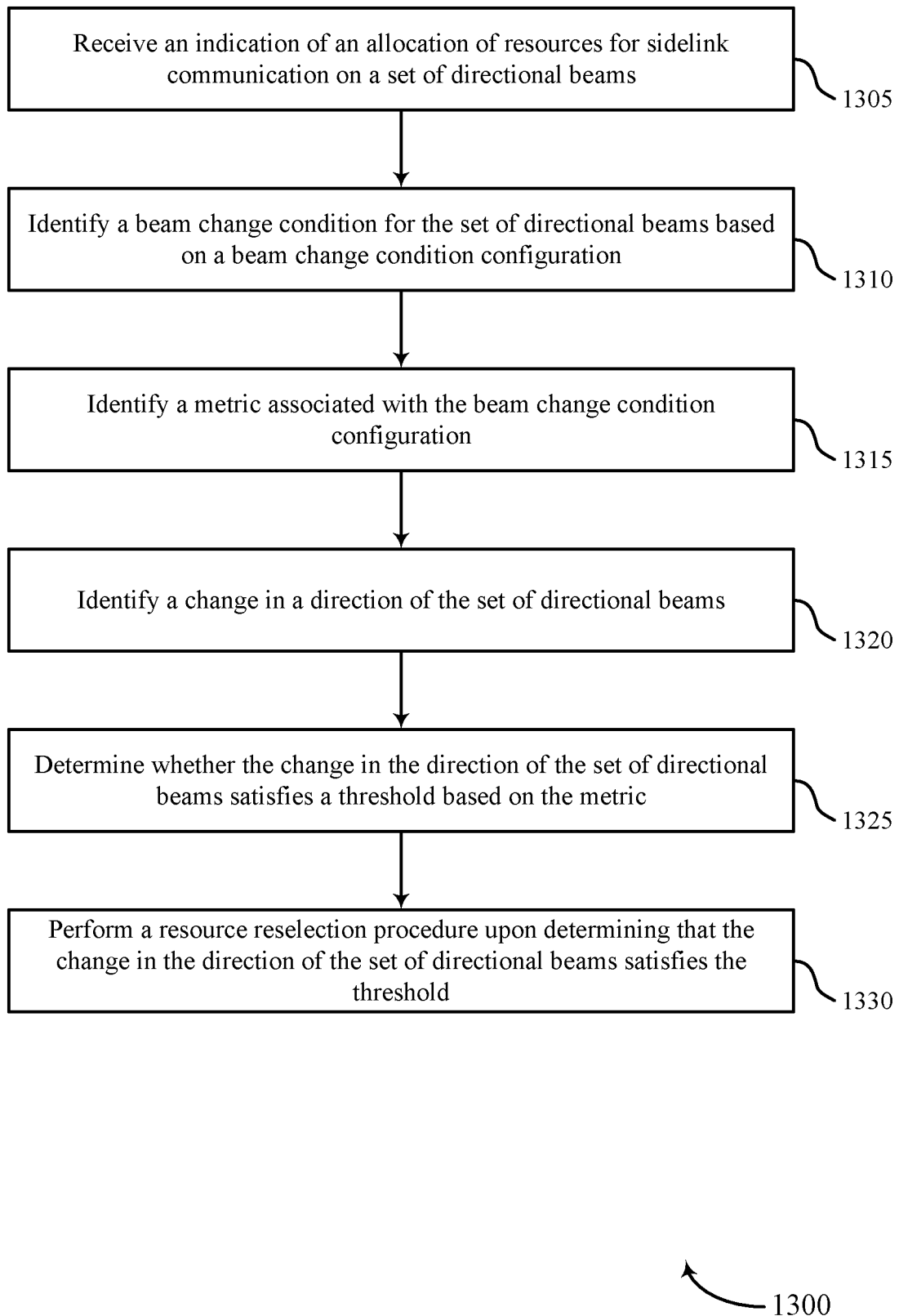

FIG. 13 shows a flowchart illustrating a method 1300 that supports resource reselection trigger with beamforming in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive an indication of an allocation of resources for sidelink communication on a set of directional beams. The operations of 1305 may be performed according to the methods described herein. In some examples, aspects of the operations of 1305 may be performed by a resource allocation component as described with reference to FIGS. 4 through 7.

At 1310, the UE may identify a beam change condition for the set of directional beams based on a beam change condition configuration. The operations of 1310 may be performed according to the methods described herein. In some examples, aspects of the operations of 1310 may be performed by a beam change condition component as described with reference to FIGS. 4 through 7.

At 1315, the UE may identify a metric associated with the beam change condition configuration. The operations of 1315 may be performed according to the methods described herein. In some examples, aspects of the operations of 1315 may be performed by a metric component as described with reference to FIGS. 4 through 7.

At 1320, the UE may identify a change in a direction of the set of directional beams. The operations of 1320 may be performed according to the methods described herein. In some examples, aspects of the operations of 1320 may be performed by a direction component as described with reference to FIGS. 4 through 7.

At 1325, the UE may determine whether the change in the direction of the set of directional beams satisfies a threshold based on the metric. The operations of 1325 may be performed according to the methods described herein. In some examples, aspects of the operations of 1325 may be performed by a direction component as described with reference to FIGS. 4 through 7.

At 1330, the UE may perform a resource reselection procedure upon determining that the change in the direction of the set of directional beams satisfies the threshold. The operations of 1330 may be performed according to the methods described herein. In some examples, aspects of the operations of 1330 may be performed by a resource reselection component as described with reference to FIGS. 4 through 7.

Figure 14:
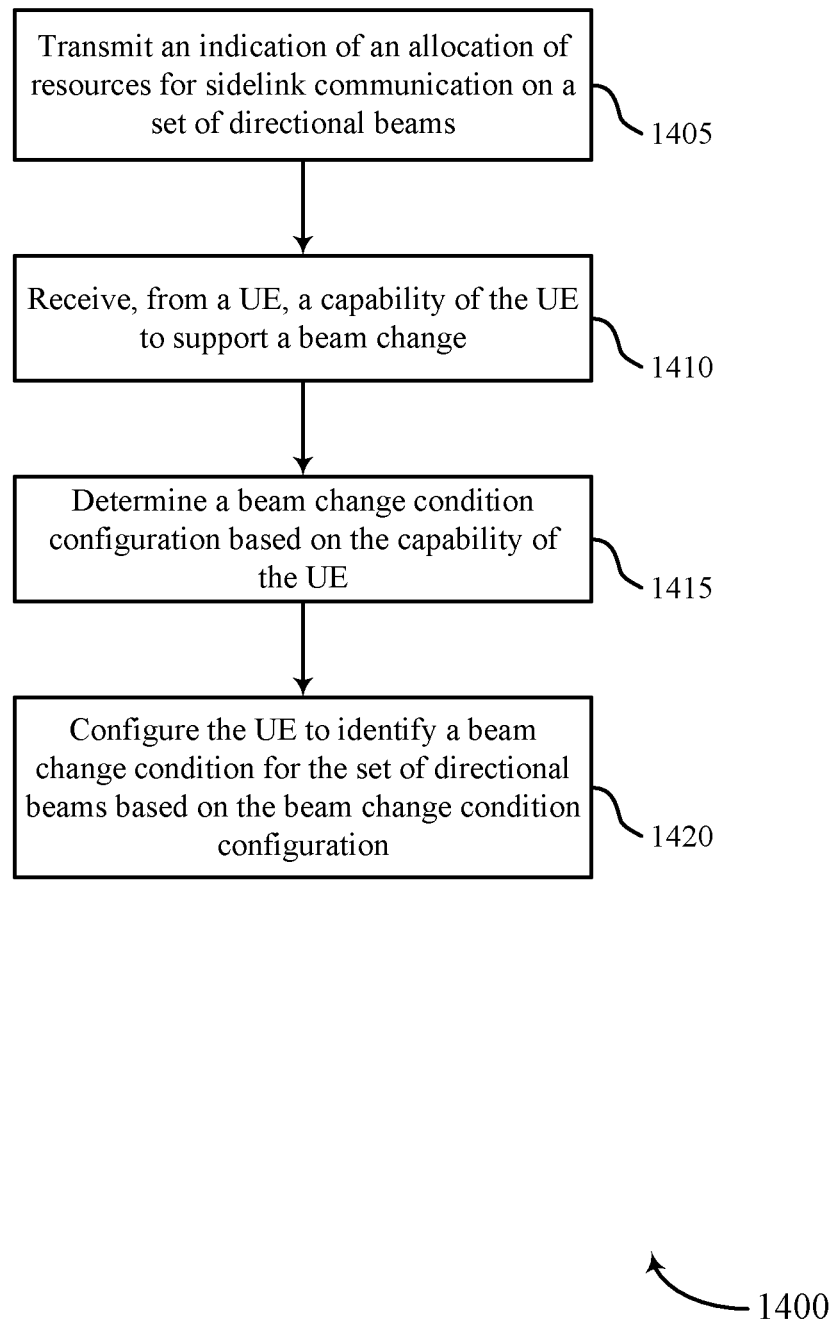

FIG. 14 shows a flowchart illustrating a method 1400 that supports resource reselection trigger with beamforming in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may transmit an indication of an allocation of resources for sidelink communication on a set of directional beams. The operations of 1405 may be performed according to the methods described herein. In some examples, aspects of the operations of 1405 may be performed by a resource allocation component as described with reference to FIGS. 8 through 11.

At 1410, the base station may receive, from a UE, a capability of the UE to support a beam change. The operations of 1410 may be performed according to the methods described herein. In some examples, aspects of the operations of 1410 may be performed by a capability component as described with reference to FIGS. 8 through 11.

At 1415, the base station may determine a beam change condition configuration based on the capability of the UE. The operations of 1415 may be performed according to the methods described herein. In some examples, aspects of the operations of 1415 may be performed by a beam change condition component as described with reference to FIGS. 8 through 11.

At 1420, the base station may configure the UE to identify a beam change condition for the set of directional beams based on the beam change condition configuration. The operations of 1420 may be performed according to the methods described herein. In some examples, aspects of the operations of 1420 may be performed by a configuration component as described with reference to FIGS. 8 through 11.

Figure 15:
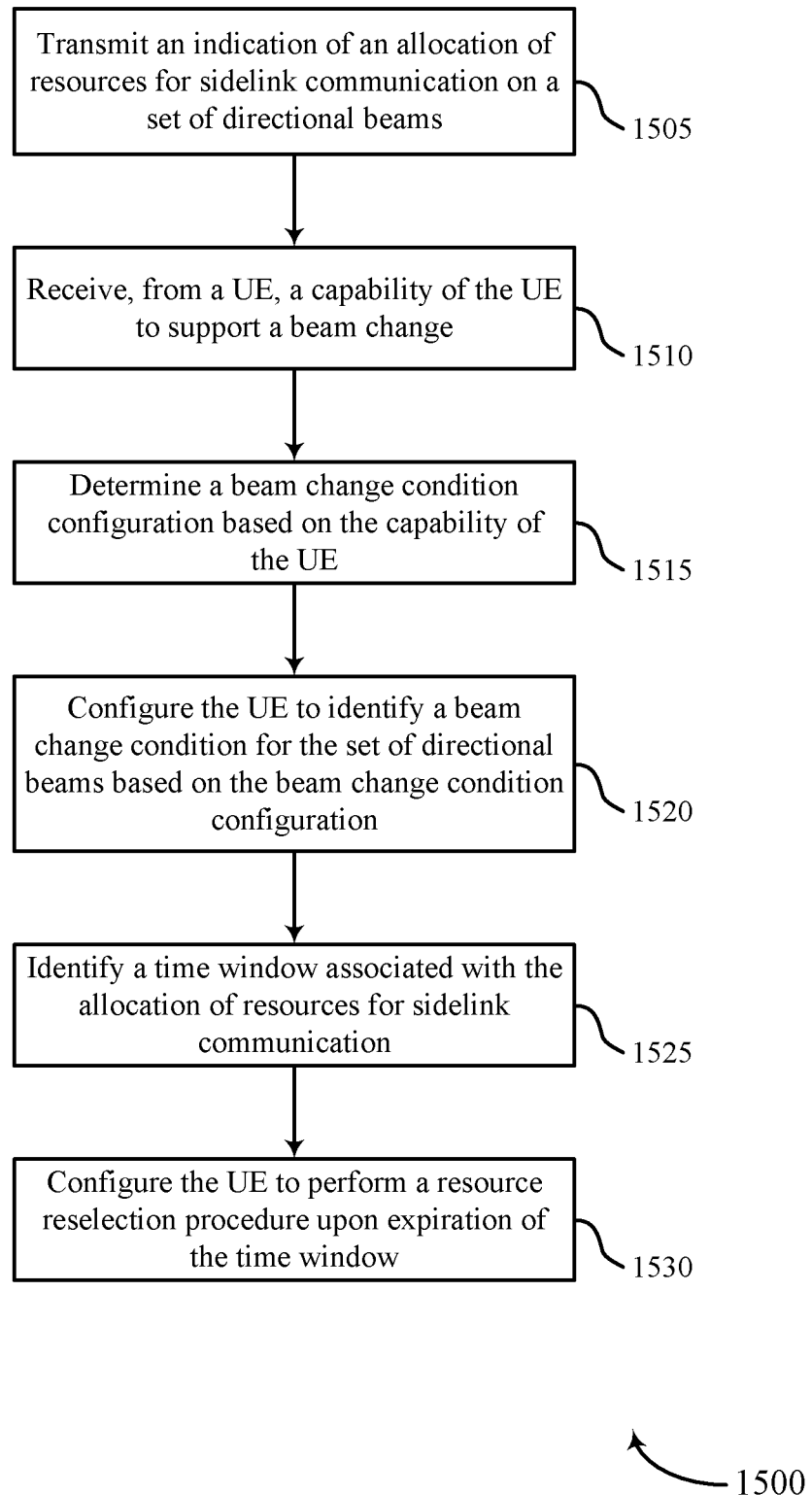

FIG. 15 shows a flowchart illustrating a method 1500 that supports resource reselection trigger with beamforming in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit an indication of an allocation of resources for sidelink communication on a set of directional beams. The operations of 1505 may be performed according to the methods described herein. In some examples, aspects of the operations of 1505 may be performed by a resource allocation component as described with reference to FIGS. 8 through 11.

At 1510, the base station may receive, from a UE, a capability of the UE to support a beam change. The operations of 1510 may be performed according to the methods described herein. In some examples, aspects of the operations of 1510 may be performed by a capability component as described with reference to FIGS. 8 through 11.

At 1515, the base station may determine a beam change condition configuration based on the capability of the UE. The operations of 1515 may be performed according to the methods described herein. In some examples, aspects of the operations of 1515 may be performed by a beam change condition component as described with reference to FIGS. 8 through 11.

At 1520, the base station may configure the UE to identify a beam change condition for the set of directional beams based on the beam change condition configuration. The operations of 1520 may be performed according to the methods described herein. In some examples, aspects of the operations of 1520 may be performed by a configuration component as described with reference to FIGS. 8 through 11.

At 1525, the base station may identify a time window associated with the allocation of resources for sidelink communication. The operations of 1525 may be performed according to the methods described herein. In some examples, aspects of the operations of 1525 may be performed by a time window component as described with reference to FIGS. 8 through 11.

At 1530, the base station may configure the UE to perform a resource reselection procedure upon expiration of the time window. The operations of 1530 may be performed according to the methods described herein. In some examples, aspects of the operations of 1530 may be performed by a configuration component as described with reference to FIGS. 8 through 11.

The following provides an overview of aspects of the present disclosure:

Aspect 1: A method for wireless communications at a UE, comprising: receiving an indication of an allocation of resources for sidelink communication on a set of directional beams; identifying a beam change condition for the set of directional beams based at least in part on a beam change condition configuration; and performing a resource reselection procedure for updating the allocation of resources for sidelink communication based at least in part on the beam change condition and the beam change condition configuration.

Aspect 2: The method of aspect 1, further comprising: identifying a resource reselection procedure trigger that indicates the beam change condition as a trigger for performing the resource reselection procedure.

Aspect 3: The method of any of aspects 1 through 2, further comprising: identifying a time window associated with the allocation of resources for sidelink communication; and performing the resource reselection procedure upon expiration of the time window.

Aspect 4: The method of aspect 3, further comprising: receiving signaling indicating a time window configuration associated with the time window.

Aspect 5: The method of any of aspects 1 through 4, further comprising: identifying a metric associated with the beam change condition configuration.

Aspect 6: The method of aspect 5, further comprising: identifying a change in a direction of the set of directional beams; determining whether the change in the direction of the set of directional beams satisfies a threshold based at least in part on the metric; and performing the resource reselection procedure upon determining that the change in the direction of the set of directional beams satisfies the threshold.

Aspect 7: The method of aspect 6, wherein the threshold is configured according to the set of directional beams.

Aspect 8: The method of any of aspects 5 through 7, further comprising: receiving signaling indicating a configuration associated with the metric.

Aspect 9: The method of any of aspects 5 through 8, further comprising: identifying a plurality of subsets of directional beams based at least in part on the metric; and performing the resource reselection procedure upon determining a change in a beam of the set of directional beams from a first subset to a second subset of the plurality of subsets of directional beams.

Aspect 10: The method of any of aspects 5 through 9, wherein the metric quantifies one or more of a directional change with respect to a beam of the set of directional beams, a directional change between a center of a beam of the set of directional beams and a transmission direction, a plurality of subsets of directional beams, or a combination thereof.

Aspect 11: The method of any of aspects 1 through 10, further comprising: transmitting, to a base station, a capability of the UE to support a beam change, wherein the beam change condition configuration is based at least in part on the capability of the UE.

Aspect 12: The method of any of aspects 1 through 11, wherein the beam change condition comprises one or more of receiving instructions from a base station to change a beam of the set of directional beams, autonomously changing a beam of the set of directional beams, or a combination thereof.

Aspect 13: The method of any of aspects 1 through 12, wherein the sidelink communication is associated with licensed spectrum or unlicensed spectrum.

Aspect 14: The method of any of aspects 1 through 13, wherein the set of directional beams comprises one or more directional beams.

Aspect 15: A method for wireless communications at a base station, comprising: transmitting an indication of an allocation of resources for sidelink communication on a set of directional beams; receiving, from a UE, a capability of the UE to support a beam change; determining a beam change condition configuration based at least in part on the capability of the UE; and configuring the UE to identify a beam change condition for the set of directional beams based at least in part on the beam change condition configuration.

Aspect 16: The method of aspect 15, further comprising: configuring the UE to perform a resource reselection procedure for updating the allocation of resources for sidelink communication based at least in part on the beam change condition and the beam change condition configuration.

Aspect 17: The method of aspect 16, further comprising: identifying a resource reselection procedure trigger that indicates the beam change condition as a trigger for performing the resource reselection procedure.

Aspect 18: The method of any of aspects 15 through 17, further comprising: identifying a time window associated with the allocation of resources for sidelink communication; and configuring the UE to perform a resource reselection procedure upon expiration of the time window.

Aspect 19: The method of aspect 18, further comprising: determining a time window configuration associated with the time window; and transmitting signaling indicating the time window configuration associated with the time window.

Aspect 20: The method of any of aspects 15 through 19, further comprising: identifying a metric associated with the beam change condition configuration.

Aspect 21: The method of aspect 20, further comprising: determining a configuration associated with the metric; and transmitting signaling indicating the configuration associated with the metric.

Aspect 22: The method of any of aspects 20 through 21, wherein the metric quantifies one or more of a directional change with respect to a beam of the set of directional beams, a directional change between a center of a beam of the set of directional beams and a transmission direction, a plurality of subsets of directional beams, a change in power level of a directional beam, or a combination thereof.

Aspect 23: The method of any of aspects 15 through 22, wherein the beam change condition comprises transmitting instructions to the UE to change a beam of the set of directional beams.

Aspect 24: The method of any of aspects 15 through 23, wherein the sidelink communication is associated with licensed spectrum or unlicensed spectrum.

Aspect 25: The method of any of aspects 15 through 24, wherein the set of directional beams comprises one or more directional beams.

Aspect 26: An apparatus for wireless communications at a UE, comprising a processor; memory coupled with the processor; and instructions stored in the memory and executable by the processor to cause the apparatus to perform a method of any of aspects 1 through 14.

Aspect 27: An apparatus for wireless communications at a UE, comprising at least one means for performing a method of any of aspects 1 through 14.

Aspect 28: A non-transitory computer-readable medium storing code for wireless communications at a UE, the code comprising instructions executable by a processor to perform a method of any of aspects 1 through 14.

Aspect 29: An apparatus for wireless communications at a base station, comprising a processor; memory coupled with the processor; and instructions stored in the memory and executable by the processor to cause the apparatus to perform a method of any of aspects 15 through 25.

Aspect 30: An apparatus for wireless communications at a base station, comprising at least one means for performing a method of any of aspects 15 through 25.

Aspect 31: A non-transitory computer-readable medium storing code for wireless communications at a base station, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

receiving an indication of an allocation of resources for sidelink communication on a set of directional beams;

identifying a beam change condition for the set of directional beams based at least in part on a beam change condition configuration, wherein the beam change condition comprises an expiration of a time window associated with the allocated resources and a change from using one or more first directional beams to using one or more second directional beams for sidelink communications; and performing a resource reselection procedure for updating the allocation of resources for sidelink communication upon expiration of the time window based at least in part on the beam change condition comprising the expiration of the time window and the change in directional beams, and based at least in part on the beam change condition configuration.

2. The method of claim 1, further comprising:

identifying a resource reselection procedure trigger that indicates the beam change condition as a trigger for performing the resource reselection procedure.

3. The method of claim 1, further comprising:

receiving signaling indicating a time window configuration associated with the time window.

4. The method of claim 1, further comprising:

identifying a metric associated with the beam change condition configuration.

5. The method of claim 4, further comprising:
identifying a change in a direction of the set of directional beams;
determining whether the change in the direction of the set of directional beams satisfies a threshold based at least in part on the metric; and
performing the resource reselection procedure upon determining that the change in the direction of the set of directional beams satisfies the threshold.

6. The method of claim 5, wherein the threshold is configured according to the set of directional beams.

7. The method of claim 4, further comprising:
receiving signaling indicating a configuration associated with the metric.

8. The method of claim 4, further comprising:
identifying a plurality of subsets of directional beams based at least in part on the metric; and
performing the resource reselection procedure upon determining a change in a beam of the set of directional beams from a first subset to a second subset of the plurality of subsets of directional beams.

9. The method of claim 4, wherein the metric quantifies one or more of a directional change with respect to a beam of the set of directional beams, a directional change between a center of a beam of the set of directional beams and a transmission direction, a plurality of subsets of directional beams, or a combination thereof.

10. The method of claim 1, further comprising:
transmitting, to a base station, a capability of the UE to support a beam change, wherein the beam change condition configuration is based at least in part on the capability of the UE.

11. The method of claim 1, wherein the beam change condition comprises one or more of receiving instructions from a base station to change a beam of the set of directional beams, autonomously changing a beam of the set of directional beams, or a combination thereof.

12. The method of claim 1, wherein the sidelink communication is associated with licensed spectrum or unlicensed spectrum.

13. The method of claim 1, wherein the set of directional beams comprises one or more directional beams.

14. A method for wireless communications at a network entity, comprising:
transmitting an indication of an allocation of resources for sidelink communication on a set of directional beams;
receiving, from a user equipment (UE), a capability of the UE to support a beam change;
determining a beam change condition configuration based at least in part on the capability of the UE; and
configuring the UE to identify a beam change condition for the set of directional beams based at least in part on the beam change condition configuration, wherein the beam change condition comprises an expiration of a time window associated with the allocated resources and a change from using one or more first directional beams to using one or more second directional beams for sidelink communications, the time window and the change in directional beams both associated with a resource reselection procedure following the expiration of the time window.

15. The method of claim 14, further comprising:
configuring the UE to perform a resource reselection procedure for updating the allocation of resources for sidelink communication based at least in part on the beam change condition and the beam change condition configuration.

16. The method of claim 15, further comprising:
identifying a resource reselection procedure trigger that indicates the beam change condition as a trigger for performing the resource reselection procedure.

17. The method of claim 14, further comprising:
determining a time window configuration associated with the time window; and
transmitting signaling indicating the time window configuration associated with the time window.

18. The method of claim 14, further comprising:
identifying a metric associated with the beam change condition configuration.

19. The method of claim 18, further comprising:
determining a configuration associated with the metric; and
transmitting signaling indicating the configuration associated with the metric.

20. The method of claim 18, wherein the metric quantifies one or more of a directional change with respect to a beam of the set of directional beams, a directional change between a center of a beam of the set of directional beams and a transmission direction, a plurality of subsets of directional beams, a change in power level of a directional beam, or a combination thereof.

21. The method of claim 14, wherein the beam change condition comprises transmitting instructions to the UE to change a beam of the set of directional beams.

22. The method of claim 14, wherein the sidelink communication is associated with licensed spectrum or unlicensed spectrum.

23. The method of claim 14, wherein the set of directional beams comprises one or more directional beams.

24. An apparatus for wireless communications at a user equipment (UE), comprising:
a processor,
memory coupled with the processor; and
instructions stored in the memory and executable by the processor to cause the apparatus to:
receive an indication of an allocation of resources for sidelink communication on a set of directional beams;
identify a beam change condition for the set of directional beams based at least in part on a beam change condition configuration, wherein the beam change condition comprises an expiration of a time window associated with the allocated resources and a change from using one or more first directional beams to using one or more second directional beams for sidelink communications; and
perform a resource reselection procedure for updating the allocation of resources for sidelink communication upon expiration of the time window based at least in part on the beam change condition comprising the expiration of the time window and the change in directional beams, and based at least in part on the beam change condition configuration.

25. The apparatus of claim 24, wherein the instructions are further executable by the processor to cause the apparatus to:
identify a resource reselection procedure trigger that indicates the beam change condition as a trigger for performing the resource reselection procedure.

26. An apparatus for wireless communications at a network entity, comprising:
- a processor,
- memory coupled with the processor; and
- instructions stored in the memory and executable by the processor to cause the apparatus to:
  - transmit an indication of an allocation of resources for sidelink communication on a set of directional beams;
  - receive, from a user equipment (UE), a capability of the UE to support a beam change;
  - determine a beam change condition configuration based at least in part on the capability of the UE; and
  - configure the UE to identify a beam change condition for the set of directional beams based at least in part on the beam change condition configuration, wherein the beam change condition comprises an expiration of a time window associated with the allocated resources and a change from using one or more first directional beams to using one or more second directional beams for sidelink communications, the time window and the change in directional beams both associated with a resource reselection procedure following the expiration of the time window.

27. The apparatus of claim 26, wherein the instructions are further executable by the processor to cause the apparatus to:
- configure the UE to perform a resource reselection procedure for updating the allocation of resources for sidelink communication based at least in part on the beam change condition and the beam change condition configuration.

* * * * *